(12) United States Patent
Karafin et al.

(10) Patent No.: US 12,130,955 B2
(45) Date of Patent: Oct. 29, 2024

(54) LIGHT FIELD DISPLAY FOR MOBILE DEVICES

(71) Applicant: Light Field Lab, Inc., San Jose, CA (US)

(72) Inventors: Jonathan Sean Karafin, San Jose, CA (US); Brendan Elwood Bevensee, San Jose, CA (US)

(73) Assignee: Light Field Lab, Inc., San Jose, CA (US)

( * ) Notice: Subject to any disclaimer, the term of this patent is extended or adjusted under 35 U.S.C. 154(b) by 85 days.

(21) Appl. No.: 17/640,081

(22) PCT Filed: Sep. 3, 2019

(86) PCT No.: PCT/US2019/049379
§ 371 (c)(1),
(2) Date: Mar. 3, 2022

(87) PCT Pub. No.: WO2021/045730
PCT Pub. Date: Mar. 11, 2021

(65) Prior Publication Data
US 2022/0326760 A1 Oct. 13, 2022

(51) Int. Cl.
*G06F 3/01* (2006.01)
*G02B 30/10* (2020.01)
(Continued)

(52) U.S. Cl.
CPC .............. *G06F 3/011* (2013.01); *G02B 30/10* (2020.01); *G02B 30/56* (2020.01); *G06F 3/016* (2013.01);
(Continued)

(58) Field of Classification Search
CPC ...... G06F 3/011; G06F 3/016; G06F 3/04815; G06F 21/33; G06F 3/013; G06F 3/017;
(Continued)

(56) References Cited

U.S. PATENT DOCUMENTS 5,374,976 A 12/1994 Spannenburg
8,149,265 B2 4/2012 Smalley et al.
(Continued)

FOREIGN PATENT DOCUMENTS

CN 102231044 A 11/2011
CN 102591124 A 7/2012
(Continued)

OTHER PUBLICATIONS

EP-19944529.7 European Extended Search Report of European Patent Office dated Jul. 28, 2023.
(Continued)

*Primary Examiner* — William Lu

(57) ABSTRACT

A light field display system is implemented in a mobile device to present the user with holographic content which includes at least one holographic object, providing the user with an immersive operational experience. The system generates and presents holographic content for the user. In one embodiment, the system receives a command from the user. In some embodiments, the presented holographic content may comprise a holographic user interface that is used by the system to receive the commands from the user of the mobile device. Subsequently, the system recognizes the received commands, determines one or more computational commands for execution by the system, and executes the determined computational command.

23 Claims, 13 Drawing Sheets

(51) Int. Cl.
　　　*G02B 30/56*　　　(2020.01)
　　　*G06F 3/04815*　　(2022.01)
　　　*G06F 21/33*　　　(2013.01)
　　　*G06T 11/40*　　　(2006.01)
　　　*H04L 67/306*　　(2022.01)

(52) U.S. Cl.
　　　CPC .......... *G06F 3/04815* (2013.01); *G06F 21/33* (2013.01); *G06T 11/40* (2013.01); *H04L 67/306* (2013.01)

(58) Field of Classification Search
　　　CPC ......... G02B 30/10; G02B 30/56; G06T 11/40; H04L 67/306; G03H 2001/0061; G03H 1/0005; G03H 3/00
　　　See application file for complete search history.

(56) References Cited

U.S. PATENT DOCUMENTS

| | | | |
|---|---|---|---|
| 9,661,272 B1* | 5/2017 | Daniel | G03H 1/0005 |
| 10,432,919 B2 | 10/2019 | Lapstun | |
| 10,453,431 B2* | 10/2019 | El-Ghoroury | G09G 3/003 |
| 10,560,689 B2* | 2/2020 | Lapstun | H04N 13/128 |
| 10,832,589 B1* | 11/2020 | Anzalone | G09B 19/00 |
| 2006/0028400 A1 | 2/2006 | Apstun et al. | |
| 2008/0144174 A1 | 6/2008 | Lucente et al. | |
| 2008/0170293 A1 | 7/2008 | Lucente et al. | |
| 2008/0212154 A1* | 9/2008 | Feinsod | G02B 27/20 359/196.1 |
| 2009/0040294 A1 | 2/2009 | Smalley et al. | |
| 2010/0156781 A1* | 6/2010 | Fahn | H04N 7/144 345/156 |
| 2011/0012895 A1 | 1/2011 | Lucente et al. | |
| 2012/0287223 A1* | 11/2012 | Zhang | H04N 7/144 348/E7.083 |
| 2012/0313839 A1 | 12/2012 | Smithwick et al. | |
| 2013/0069933 A1 | 3/2013 | Smithwick et al. | |
| 2013/0076930 A1 | 3/2013 | Border et al. | |
| 2013/0127889 A1* | 5/2013 | Winnemoeller | G06T 17/20 345/582 |
| 2013/0163089 A1 | 6/2013 | Bohn | |
| 2013/0195410 A1 | 8/2013 | Karbasivalashani et al. | |
| 2013/0265485 A1 | 10/2013 | Kang | |
| 2014/0035959 A1 | 2/2014 | Lapstun | |
| 2014/0132694 A1 | 5/2014 | Shacham et al. | |
| 2014/0184496 A1* | 7/2014 | Gribetz | G06F 3/0482 345/156 |
| 2014/0192087 A1 | 7/2014 | Frost | |
| 2014/0280588 A1* | 9/2014 | McPhee | H04L 51/214 709/204 |
| 2014/0293385 A1* | 10/2014 | Smithwick | G03H 1/26 359/9 |
| 2014/0300694 A1 | 10/2014 | Smalley et al. | |
| 2014/0300695 A1 | 10/2014 | Smalley et al. | |
| 2015/0037771 A1 | 2/2015 | Kaleal, III et al. | |
| 2015/0201186 A1 | 7/2015 | Smithwick | |
| 2015/0244747 A1* | 8/2015 | Wickenkamp | G06F 3/0482 726/28 |
| 2015/0277378 A1* | 10/2015 | Smithwick | G03H 1/0808 359/9 |
| 2016/0063762 A1* | 3/2016 | Heuvel | G06F 3/011 345/633 |
| 2016/0139402 A1 | 5/2016 | Lapstun | |
| 2016/0170372 A1 | 6/2016 | Smithwick | |
| 2016/0203221 A1* | 7/2016 | Rao | G06Q 50/01 707/707 |
| 2016/0260261 A1 | 9/2016 | Hsu | |
| 2016/0274539 A1 | 9/2016 | Smithwick | |
| 2016/0282614 A1 | 9/2016 | Zagolla et al. | |
| 2016/0282808 A1 | 9/2016 | Smalley | |
| 2017/0068322 A1* | 3/2017 | Steinberg | G06F 3/0304 |
| 2017/0208292 A1* | 7/2017 | Smits | G03H 1/0005 |
| 2017/0214907 A1 | 7/2017 | Lapstun | |
| 2017/0289530 A1* | 10/2017 | Smithwick | H04N 13/305 |
| 2017/0293259 A1 | 10/2017 | Ochiai et al. | |
| 2017/0316762 A1* | 11/2017 | El-Ghoroury | G06F 3/012 |
| 2017/0358144 A1* | 12/2017 | Schwarz | G06F 3/017 |
| 2017/0372457 A1* | 12/2017 | Sylvan | G09G 5/28 |
| 2018/0063519 A1 | 3/2018 | Smithwick et al. | |
| 2018/0084245 A1 | 3/2018 | Lapstun | |
| 2018/0225860 A1 | 8/2018 | Conness et al. | |
| 2018/0232937 A1* | 8/2018 | Moyer | G06T 15/005 |
| 2018/0285463 A1* | 10/2018 | Choi | G06F 16/9535 |
| 2018/0307303 A1 | 10/2018 | Powderly et al. | |
| 2018/0329209 A1* | 11/2018 | Nattukallingal | G02B 27/01 |
| 2019/0043447 A1* | 2/2019 | Chung | G03H 1/2249 |
| 2019/0095775 A1 | 3/2019 | Lembersky et al. | |
| 2019/0114695 A1* | 4/2019 | Chandorkar | G06Q 20/322 |
| 2019/0156793 A1* | 5/2019 | Sun | G09G 5/391 |
| 2019/0188895 A1* | 6/2019 | Miller, IV | H04N 7/157 |
| 2019/0200004 A1* | 6/2019 | Schubert | G02B 26/08 |
| 2019/0204907 A1 | 7/2019 | Xie et al. | |
| 2019/0208181 A1 | 7/2019 | Rowell et al. | |
| 2019/0243594 A1 | 8/2019 | Goslin et al. | |
| 2019/0259320 A1 | 8/2019 | Lapstun | |
| 2019/0310761 A1* | 10/2019 | Agarawala | G06F 3/04817 |
| 2019/0339774 A1* | 11/2019 | Baughman | G06F 3/016 |
| 2020/0290513 A1* | 9/2020 | Karafin | G02B 27/0103 |
| 2020/0368616 A1* | 11/2020 | Delamont | H04N 13/239 |
| 2021/0049666 A1* | 2/2021 | Ahas | G06Q 30/0643 |

FOREIGN PATENT DOCUMENTS

| | | | |
|---|---|---|---|
| CN | 103616770 A | 3/2014 | |
| CN | 103777455 A | 5/2014 | |
| CN | 105334690 A | 2/2016 | |
| EP | 3317716 A1 | 5/2018 | |
| JP | 2002268901 A | 9/2002 | |
| JP | 2003058138 A | 2/2003 | |
| JP | 2003085100 A | 3/2003 | |
| JP | 2009530661 A | 8/2009 | |
| JP | 2010522380 A | 7/2010 | |
| JP | 2015501468 A | 1/2015 | |
| JP | 2018528452 A | 9/2018 | |
| WO | 2008048360 A2 | 4/2008 | |
| WO | WO-2013147863 A1 * | 10/2013 | G09B 19/00 |
| WO | 2017127897 A1 | 8/2017 | |
| WO | 2019005369 A1 | 1/2019 | |
| WO | 2019140413 A1 | 7/2019 | |

OTHER PUBLICATIONS

AU-2017297629 Notice of Acceptance dated Jul. 26, 2018.
AU-2018256628 Examination Report No. 1 dated Jul. 1, 2019.
CN201780043946.8 First Office Action of the Chinese Patent Office mailed Dec. 22, 2020.
CN201780043946.8 Second Office Action of the Chinese Patent Office mailed Sep. 15, 2021.
EA-201892637 Office Action of the Eurasian Patent Office dated Mar. 6, 2020.
FA-202193101 Notification of the Search Report of the Eurasian Patent Office dated Sep. 16, 2022.
EP-17828632.4 European Partial Search Report of European Patent Office dated Feb. 10, 2020.
International Search Report and Written Opinion of PCT/US2017/042470 dated Dec. 28, 2017.
NZ-743813 First Examination Report dated Sep. 14, 2018.
International Search Report and Written Opinion of PCT/US2019/049379 dated Dec. 3, 2019.
Schroeter, "The Future of Touchscreen is Touchless", Technica Curiosa: Publication [online], Feb. 11, 2019 [retrieved Nov. 8, 2019], pp. 108.
EP-19944529.7 European Partial Search Report of European Patent Office dated Mar. 29, 2023.
CN201980100073.9 First Office Action of the Chinese Patent Office mailed Apr. 1, 2024.
JP2022-513658 Non-Final Notice of Reasons for Rejection from the Japan Patent Office mailed Oct. 3, 2023.

(56) References Cited

OTHER PUBLICATIONS

KR-10-2022-7009073 Notice of Preliminary Rejection of Korean Patent Office dated Feb. 20, 2024.
JP2022-513658 Decision of Rejection from the Japan Patent Office mailed Jun. 4, 2024.

* cited by examiner

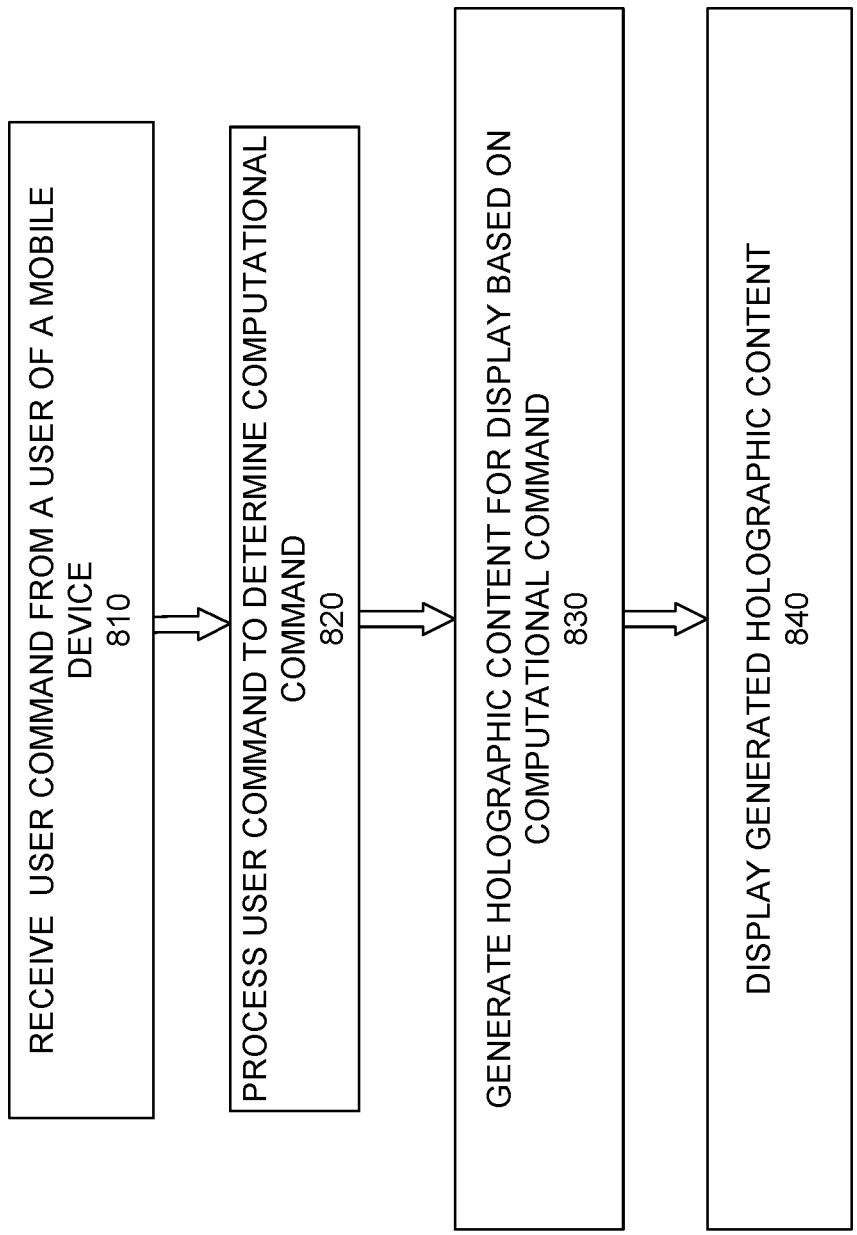

LIGHT FIELD DISPLAY FOR MOBILE DEVICES

CROSS REFERENCE TO RELATED APPLICATIONS

This application related to International Application Nos. PCT/US2017/042275, PCT/US2017/042276, PCT/US2017/042418, PCT/US2017/042452, PCT/US2017/042462, PCT/US2017/042466, PCT/US2017/042467, PCT/US2017/042468, PCT/US2017/042469, PCT/US2017/042470, and PCT/US2017/042679, all of which are incorporated by reference herein in their entirety.

BACKGROUND

The present disclosure relates to mobile devices such as smart phones and tablets, and specifically, to light field displays in mobile devices.

Mobile devices generally rely on two-dimensional (2D) visual displays—for displaying content, as well as for user interfaces. In addition to displaying two-dimensional content including text, images, and video, the 2D visual display on a mobile device is designed to provide an interactive interface for displaying a range of functionalities offered by the mobile device to the user, and for allowing a user to select and configure a desired functionality. The interactivity in a mobile device is provided using physical elements such as buttons, a keyboard, or a touch interface on the 2D visual display. However, a 2D visual display is limited in size to the footprint that the display occupies on the mobile device surface. Consequently, the display content is also limited to the size of the 2D visual display, which limits the interactivity as well as the viewing experience that may be provided to the mobile device user. In particular, 2D visual displays offers limited opportunities to provide the user with an immersive operational experience.

The described embodiments relate to techniques involving a light field display system in a mobile device that provide a mobile device user with an immersive operational experience while using the device.

SUMMARY

A light field (LF) display system in a mobile device generates holographic content for viewing by a user of the mobile device. The generated holographic content may be a holographic user interface that is displayed to the user of the mobile device. The light field display system may receive a command from the user. The LF display system determines a computational command based on the received user command, and executes the determined computational command appropriately. In some embodiments, the holographic content is augmented with a tactile surface on the generated holographic content. The tactile surface may provide a sensation of touch to the user.

In some embodiments, the mobile device comprises an LF display system that comprises a controller configured to generate holographic content, an LF display assembly, and a command interface. The LF display assembly comprises one or more LF display modules that are configured to present the holographic content in a holographic object volume to one or more users of a mobile device located in a viewing volume of the one or more LF display modules.

In some embodiments, the LF display system includes a tracking system and/or a viewer profiling module. The tracking system and viewer profiling module can monitor and store characteristics of users of the mobile device, a user profile describing a user, and/or responses of users to the holographic content presented during the operation of the mobile device. The holographic content may be created for display based on any of the monitored or stored information.

In some embodiments, a user of the mobile device may interact with the holographic content, and the interaction can act as input for the holographic content creation system. In some embodiments, the LF display system of the mobile device may generate sensory stimuli in addition to holographic content. For example, in some embodiments, some or all of the LF display system includes one or more ultrasonic speakers. The plurality of ultrasonic speakers may be configured to generate a haptic surface that coincides with at least a portion of the holographic content. The tracking system is configured to track an interaction of a user with the holographic object (e.g., via images captured by imaging sensors of the LF display modules and/or some other cameras). And the LF display system is configured to provide holographic content based on the interaction.

BRIEF DESCRIPTION OF THE DRAWINGS

FIG. 8 is a flowchart illustrating a method for enabling interaction with a mobile device using a light field display system, in accordance with one or more embodiments.

DETAILED DESCRIPTION

Overview

Figure 1:
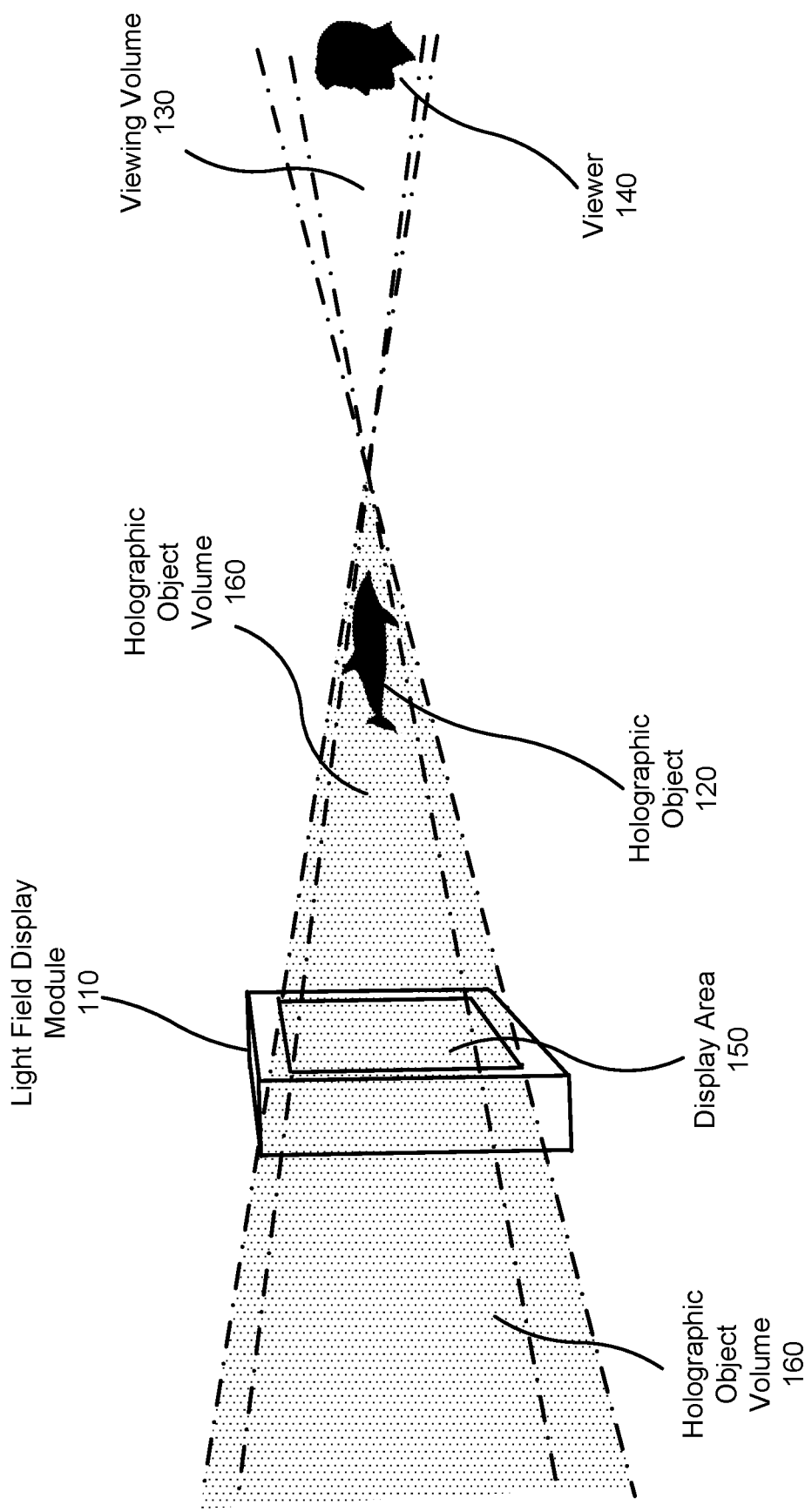
FIG. 1 is a diagram of a light field display module presenting a holographic object, in accordance with one or more embodiments.

A light field (LF) display system is implemented in a mobile device to present a mobile device user with holographic content which includes at least one holographic object. The terms "user," "mobile device user," "device user," and "viewer" are used interchangeably herein. The terms "mobile device," and "device," are also used interchangeably herein, and they refer to handheld electronic computing devices that are designed for portability and compactness. Examples of mobile devices include, but are not limited to mobile phones, smartphones, PDAs, tablets, e-readers, portable music layers, portable computers etc.

The LF display system in a mobile device is integrated with device functionality in order to provide the user with an immersive operational experience while using the device. Mobile device functionality is enabled by executing computer program modules, such as web browsers or software client application programs, which allow a device user to browse the Internet, consume media content, and execute a vast variety of software applications. The LF display system comprises a LF display assembly configured to present holographic content including one or more holographic objects that would be visible to the viewer in a viewing volume of the LF display system. The holographic content presented by the LF display system is integrated with the device functionalities; this increases the immersive experience of the device user while executing software applications on the device. The holographic content presented by the LF display system may also be augmented with other sensory stimuli (e.g., tactile, acoustic, temperature, pressure, force, or olfactory). For example, ultrasonic emitters in the LF display system may project ultrasonic pressure waves that create a volumetric haptic projection. The volumetric haptic projection provides a tactile surface that corresponds to some or all of the holographic objects that are projected. Holographic content may include additional visual content (i.e., 2D or 3D visual content). The coordination of energy sources that enables a cohesive experience is part of the LF system in implementations with multiple energy sources (i.e., holographic objects providing the correct haptic feel and sensory stimuli at any given point in time). For example, a LF system may include a controller to coordinate presentation of holographic content and haptic surfaces.

In some embodiments, the LF display system may include elements that enable the system to project at least one type of energy, and, simultaneously, sense at least one type of energy for the purpose of responding to the user and creating an interactive experience. Sensed energy may be used for recording how a viewer responds to the holographic content. For example, a LF display system can project both holographic objects for viewing as well as ultrasonic waves for haptic perception, and simultaneously record imaging information for tracking of the user and other scene analysis, while also sensing ultrasonic waves to detect touch response by the user. As an example, such a system may project a holographic object, which when virtually "touched" by a viewer, modifies its "behavior" in accordance with the touch stimuli. The display system components that perform energy sensing of the environment may be integrated into the display surface, or they may be dedicated sensors that are separate from the display surface, such as ultrasonic speakers and imaging capture devices such as cameras.

The LF display system may be constructed to provide various experiences with mobile devices based on the holographic objects generated. For example, in one embodiment, an LF display system on a mobile device may be implemented to present to the user, a holographic view of a terrain through a map viewing application. The LF display assembly may form a single-sided or a multi-sided seamless surface environment. Holographic content may augment or enhance physical objects, such as the mobile device screen itself. For example, in one embodiment, the LF display system on a device may be implemented to present a 3D holographic progress indicator gif such as, for example, an enveloping sphere to indicate that an application is loading on the device. Moreover, the user can freely view the holographic content without need of eyewear devices such as 3D glasses or any other head gear.

In some embodiments, the LF display system may receive input through a tracking system and/or a sensory feedback system. Based on the input, the LF display system can adjust the holographic content as well as provide feedback to related components.

The LF display system may also incorporate a system for tracking movement of the user within the viewing volume of the LF display system. The tracked movement of the user can be used to enhance the experience of the user using the mobile device. For example, the LF display system can use the tracking information to facilitate user interactions with the holographic content (e.g., pushing a holographic button). The LF display system can use the tracked information to monitor finger location relative to a holographic object. For example, the holographic object may be a button that can be "pushed" by a viewer. The LF display system can project ultrasonic energy to generate a tactile surface that corresponds to the button and occupies substantially the same space as the button. The LF display system can use the tracking information to dynamically move the location of the tactile surface along with dynamically moving the button as it is "pushed" by the viewer. The LF display system may use the tracking information to render a holographic character that looks at and/or makes eye contact, or interacts in other ways with the user. The LF display system may use the tracking information to render a holographic object that "touches" the user by being projected in close proximity to the user, where ultrasonic speakers create a tactile surface by which the holographic object generate the sensation of touch for the user.

Additionally, the LF display system may incorporate a user profiling system for identifying each user so as to provide personalized content to each device user. The user profiling system may further record information about usage of the device (e.g. types of content viewed, places travelled) which can be retrieved on a subsequent use for personalizing holographic content.

Light Field Display System Overview

FIG. 1 is a diagram 100 of a light field (LF) display module 110 presenting a holographic object 120, in accordance with one or more embodiments. The LF display module 110 is part of a light field (LF) display system. The LF display system presents holographic content including at least one holographic object using one or more LF display modules. The LF display system can present holographic content to one or multiple viewers. In some embodiments, the LF display system may also augment the holographic content with other sensory content (e.g., touch, audio, smell/olfactory, pressure, force, or temperature). For example, as discussed below, the projection of focused ultrasonic sound waves may generate a mid-air tactile sensation that can simulate a surface of some or all of a holographic object. The LF display system includes one or more LF display modules 110, and is discussed in detail below with regard to FIGS. 2-8.

The LF display module 110 is a holographic display that presents holographic objects (e.g., the holographic object 120) to one or more viewers (e.g., viewer 140). The LF display module 110 includes an energy device layer (e.g., an emissive electronic display or acoustic projection device) and an energy waveguide layer (e.g., optical lens array). Additionally, the LF display module 110 may include an energy relay layer for the purpose of combining multiple energy sources or detectors together to form a single surface. At a high-level, the energy device layer generates energy (e.g., holographic content) that is then directed using the energy waveguide to a region in space in accordance with one or more four-dimensional (4D) light field functions. The LF display module 110 may also project and/or sense one or more types of energy simultaneously. For example, LF display module 110 may be able to project a holographic image as well as an ultrasonic tactile surface in a viewing volume, while simultaneously detecting imaging data from the viewing volume. The operation of the LF display module 110 is discussed in detail below with regard to FIGS. 2-3.

The LF display module 110 generates holographic objects within a holographic object volume 160 using one or more 4D light field functions (e.g., derived from a plenoptic function). The holographic objects can be three-dimensional (3D), two-dimensional (2D), or some combination thereof. Moreover, the holographic objects may be polychromatic (e.g., full color). The holographic objects may be projected in front of the screen plane, behind the screen plane, or split by the screen plane. A holographic object 120 can be presented such that it is perceived anywhere within the holographic object volume 160. A holographic object within the holographic object volume 160 may appear to a viewer 140 to be floating in space.

A holographic object volume 160 represents a volume in which holographic objects may be perceived by a viewer 140. The holographic object volume 160 can extend in front of the display surface 150 (i.e., towards the viewer 140), such that holographic objects can be presented in front of the plane of the display area 150. Additionally, the holographic object volume 160 can extend behind the surface of the display area 150 (i.e., away from the viewer 140), allowing for holographic objects to be presented as if they are behind the plane of the display area 150. In other words, the holographic object volume 160 may include all the rays of light that originate (e.g., are projected) from a display area 150 and can converge to create a holographic object. Herein, light rays may converge at a point that is in front of the display surface, at the display surface, or behind the display surface. More simply, the holographic object volume 160 encompasses all of the volume from which a holographic object may be perceived by a viewer.

A viewing volume 130 is a volume of space from which holographic objects (e.g., holographic object 120) presented within a holographic object volume 160 by the LF display system are fully viewable. The holographic objects may be presented within the holographic object volume 160, and viewed within the viewing volume 130, such that they are indistinguishable from actual objects. A holographic object is formed by projecting the same light rays that would be generated from the surface of the object were it physically present.

In some cases, the holographic object volume 160 and the corresponding viewing volume 130 may be relatively small-such that it is designed for a single viewer. In other embodiments, as discussed in detail below with regard to, e.g., FIGS. 4A and 4B, the LF display modules may be enlarged and/or tiled to create larger holographic object volumes and corresponding viewing volumes that can accommodate a large range of viewers (e.g., one to thousands). The LF display modules presented in this disclosure are built so that the full surface of the module contains holographic imaging optics, with no inactive or dead space, without any need for bezels. In these embodiments, the LF display modules may be tiled so that the imaging area is continuous across the seam of the tile between LF display modules, and the bond line between the tiled modules is virtually undetectable using the visual acuity of the eye. Notably, in some configurations, some portion of the display surface may not include holographic imaging optics, although they are not described in detail herein.

The flexible size and/or shape of the viewing volume 130 allows for viewers to be unconstrained within the viewing volume 130. For example, the viewer 140 can move to a different position within the viewing volume 130 and see a different view of the holographic object 120 from the corresponding perspective. To illustrate, referring to FIG. 1, the viewer 140 is at a first position relative to the holographic object 120 such that the holographic object 120 appears to be a head-on view of a dolphin. The viewer 140 may move to other locations relative to the holographic object 120 to see different views of the dolphin. For example, the viewer 140 may move such that he/she sees a left side of the dolphin, a right side of the dolphin, etc., much like if the viewer 140 was looking at an actual dolphin and changed his/her relative position to the actual dolphin to see different aspects of the dolphin. In some embodiments, the holographic object 120 is visible to all viewers within the viewing volume 130 that have an unobstructed line (i.e., not blocked by an object/person) of sight to the holographic object 120. These viewers may be unconstrained such that they can move around within the viewing volume to see different perspectives of the holographic object 120. Accordingly, the LF display system may present holographic objects such that a plurality of unconstrained viewers may simultaneously see different perspectives of the holographic objects in real-world space as if the holographic objects were physically present.

In contrast, conventional displays (e.g., stereoscopic, virtual reality, augmented reality, or mixed reality) generally require each viewer to wear some sort of external device (e.g., 3-D glasses, a near-eye display, or a head-mounted display) in order to see content. Additionally and/or alternatively, conventional displays may require that a viewer be constrained to a particular viewing position (e.g., in a chair that has fixed location relative to the display). For example, when viewing an object shown by a stereoscopic display, a viewer always focuses on the display surface, rather than on the object, and the display will always present just two views of an object that will follow a viewer who attempts to move around that perceived object, causing distortions in the perception of that object. With a light field display, however, viewers of a holographic object presented by the LF display system do not need to wear an external device in order to see the holographic object. The LF display system presents the holographic object in a manner that is visible to viewers in much the same way a physical object would be visible to the viewers, with no requirement of special eyewear, glasses, or a head-mounted accessory. Further, the viewer may view holographic content from any location within a viewing volume.

Notably, potential locations for holographic objects within the holographic object volume 160 are limited by the size of the volume. In order to increase the size of the holographic object volume 160, a size of a display area 150 of the LF display module 110 may be increased and/or multiple LF display modules may be tiled together in a manner that forms a seamless display surface that has an effective display area that is larger than the display areas of the individual LF display modules. Some embodiments relating to tiling LF display modules are discussed below with regard to FIGS. 4A and 4B. As illustrated in FIG. 1, the display area 150 is rectangular resulting in a holographic object volume 160 that is a pyramid. In other embodiments, the display area may have some other shape (e.g., hexagonal), which also affects the shape of the corresponding viewing volume.

Additionally, while the above discussion focuses on presenting the holographic object 120 within a portion of the holographic object volume 160 that is between the LF display module 110 and the viewer 140, the LF display module 110 can additionally present content that appears behind the plane of the display area 150. For example, the LF display module 110 may make a portion of a displayed holographic object appear make the display area 150 appear to be a surface of the ocean that the holographic object 120 is jumping out of. The displayed content may be such that the viewer 140 is able to look through the displayed surface to see marine life that is under water. Moreover, the LF display system can generate content that seamlessly moves around the holographic object volume 160, including behind and in front of the plane of the display surface 150.

Figure 2A:
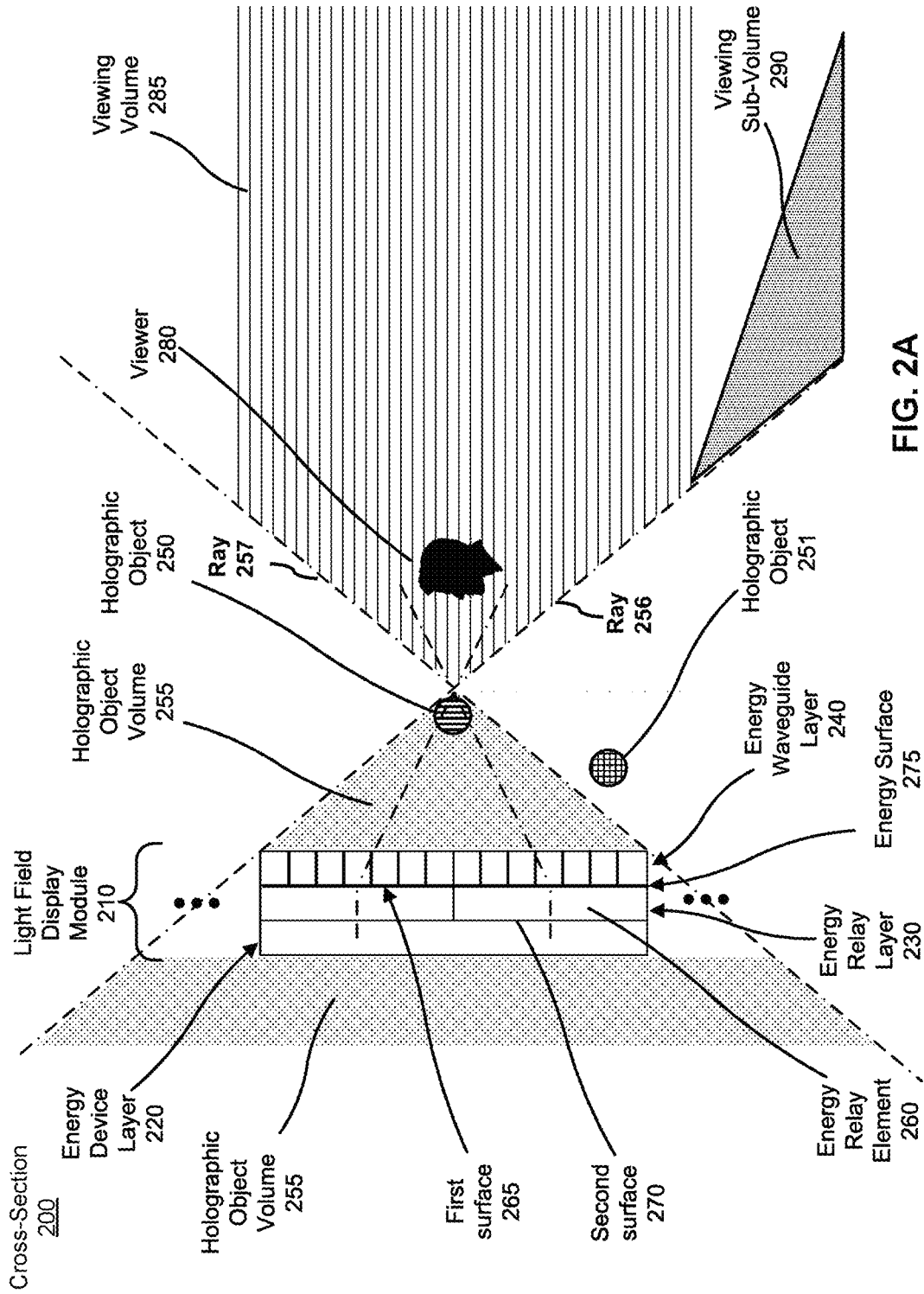
FIG. 2A is a cross section of a portion of a light field display module, in accordance with one or more embodiments.

FIG. 2A is a cross section 200 of a portion of a LF display module 210, in accordance with one or more embodiments. The LF display module 210 may be the LF display module 110. In other embodiments, the LF display module 210 may be another LF display module with a different display area shape than display area 150. In the illustrated embodiment, the LF display module 210 includes an energy device layer 220, an energy relay layer 230, and an energy waveguide layer 240. Some embodiments of the LF display module 210 have different components than those described here. For example, in some embodiments, the LF display module 210 does not include the energy relay layer 230. Similarly, the functions can be distributed among the components in a different manner than is described here.

The display system described here presents an emission of energy that replicates the energy normally surrounding an object in the real world. Here, emitted energy is directed towards a specific direction from every coordinate on the display surface. In other words, the various coordinates on the display surface act as a projection locations for emitted energy. The directed energy from the display surface enables convergence of many rays of energy, which, thereby, can be create holographic objects. For visible light, for example, the LF display will project a very large number of light rays to converge at any point in the holographic object volume so they will appear to come from the surface of a real-world object located in this region of space from the perspective of a viewer that is located further away than the object being projected. In this way, the LF display is generating the rays of reflected light that would leave such an object's surface from the perspective of the viewer. The viewer perspective may change on any given holographic object, and the viewer will see a different view of that holographic object.

The energy device layer 220 includes one or more electronic displays (e.g., an emissive display such as an OLED) and one or more other energy projection and/or energy receiving devices as described herein. The one or more electronic displays are configured to display content in accordance with display instructions (e.g., from a controller of a LF display system). The one or more electronic displays include a plurality of pixels, each with an intensity that is individually controlled. Many types of commercial displays, such as emissive LED and OLED displays, may be used in the LF display.

The energy device layer 220 may also include one or more acoustic projection devices and/or one or more acoustic receiving devices. An acoustic projection device generates one or more pressure waves that complement the holographic object 250. The generated pressure waves may be, e.g., audible, ultrasonic, or some combination thereof. An array of ultrasonic pressure waves may be used for volumetric tactile sensation (e.g., at a surface of the holographic object 250). An audible pressure wave is used for providing audio content (e.g., immersive audio) that can complement the holographic object 250. For example, assuming the holographic object 250 is a dolphin, one or more acoustic projection devices may be used to (1) generate a tactile surface that is collocated with a surface of the dolphin such that viewers may touch the holographic object 250; and (2) provide audio content corresponding to noises that a dolphin makes such as clicks, chirping, or chatter. An acoustic receiving device (e.g., a microphone or microphone array) may be configured to monitor ultrasonic and/or audible pressure waves within a local area of the LF display module 210.

The energy device layer 220 may also include one or more imaging sensors. An imaging sensor is at least sensitive to light in a visible optical band, and in some cases may be sensitive to light in other bands (e.g., infrared). The imaging sensor may be, e.g., a complementary metal oxide semiconductor (CMOS) array, a charged coupled device (CCD), an array of photodetectors, some other sensor that captures light, or some combination thereof. The LF display system may use data captured by the one or more imaging sensors for position location tracking of viewers.

The energy relay layer 230 relays energy (e.g., electromagnetic, mechanical pressure waves) between the energy device layer 220 and the energy waveguide layer 240. The energy relay layer 230 includes one or more energy relay elements 260. Each energy relay element includes a first surface 265 and a second surface 270, and it relays energy between the two surfaces. The first surface 265 of each energy relay element may be coupled to one or more energy devices (e.g., electronic display or acoustic projection device) An energy relay element may be composed of, e.g., glass, carbon, optical fiber, optical film, plastic, polymer, or some combination thereof. Additionally, in some embodiments, an energy relay element may adjust magnification (increase or decrease) of energy passing between the first surface 265 and the second surface 270. If the relay offers magnification, then the relay may take the form of an array of bonded tapered relays, called tapers, where the area of one end of the taper may be substantially larger than the opposite end. The large end of the tapers can be bonded together to form a seamless energy surface 275. One advantage is that space is created on the multiple small ends of each taper to accommodate the mechanical envelope of multiple energy sources, such as the bezels of multiple displays. This extra room allows the energy sources to be placed side-by-side on the small taper side, with each energy source having their active areas directing energy into the small taper surface and relayed to the large seamless energy surface. Another advantage to using tapered relays is that there is no non-imaging dead space on the combined seamless energy surface formed by the large end of the tapers. No border or bezel exists, and so the seamless energy surfaces can then be tiled together to form a larger surface with virtually no seams according to the visual acuity of the eye.

The second surfaces of adjacent energy relay elements come together to form an energy surface 275. In some embodiments, a separation between edges of adjacent energy relay elements is less than a minimum perceptible contour as defined by a visual acuity of a human eye having better than 20/40 vision, such that the energy surface 275 is effectively seamless from the perspective of a viewer 280 within a viewing volume 285.

In some embodiments, the second surfaces of adjacent energy relay elements are fused together with processing steps that may include one or more of pressure, heat, and a chemical reaction, in such a way no seam exists between them. And still in other embodiments, an array of energy relay elements is formed by molding one side of a continuous block of relay material into an array of small taper ends, each configured to transport energy from an energy device attached to the small tapered end into a single combined surface with a larger area which is never subdivided.

In some embodiments, one or more of the energy relay elements exhibit energy localization, where the energy transport efficiency in the longitudinal direction substantially normal to the surfaces 265 and 270 is much higher than the transport efficiency in the perpendicular transverse plane, and where the energy density is highly localized in this transverse plane as the energy wave propagates between surface 265 and surface 270. This localization of energy allows an energy distribution, such as an image, to be efficiency relayed between these surfaces without any significant loss in resolution.

The energy waveguide layer 240 directs energy from a location (e.g., a coordinate) on the energy surface 275 into a specific propagation path outward from the display surface into the holographic viewing volume 285 using waveguide elements in the energy waveguide layer 240. The energy propagation path is defined by two angular dimensions determined at least by the energy surface coordinate location relative to the waveguide. The waveguide is associated with a spatial 2D coordinate. Together, these four coordinates form a four-dimensional (4D) energy field. As an example, for electromagnetic energy, the waveguide elements in the energy waveguide layer 240 direct light from positions on the seamless energy surface 275 along different propagation directions through the viewing volume 285. In various examples, the light is directed in accordance with a 4D light field function to form the holographic object 250 within the holographic object volume 255.

Each waveguide element in the energy waveguide layer 240 may be, for example, a lenslet composed of one or more elements. In some configurations, the lenslet may be a positive lens. The positive lens may have a surface profile that is spherical, aspherical, or freeform. Additionally, in some embodiments, some or all of the waveguide elements may include one or more additional optical components. An additional optical component may be, e.g., an energy-inhibiting structure such as a baffle, a positive lens, a negative lens, a spherical lens, an aspherical lens, a freeform lens, a liquid crystal lens, a liquid lens, a refractive element, a diffractive element, or some combination thereof. In some embodiments, the lenslet and/or at least one of the additional optical components is able to dynamically adjust its optical power. For example, the lenslet may be a liquid crystal lens or a liquid lens. Dynamic adjustment of a surface profile the lenslet and/or at least one additional optical component may provide additional directional control of light projected from a waveguide element.

In the illustrated example, the holographic object volume 255 of the LF display has boundaries formed by light ray 256 and light ray 257, but could be formed by other rays. The holographic object volume 255 is a continuous volume that extends both in front (i.e., towards the viewer 280) of the energy waveguide layer 240 and behind it (i.e., away from the viewer 280). In the illustrated example, ray 256 and ray 257 are projected from opposite edges of the LF display module 210 at the highest angle relative to the normal to the display surface 277 that may be perceived by a user, but these could be other projected rays. The rays define the field-of-view of the display, and, thus, define the boundaries for the holographic viewing volume 285. In some cases, the rays define a holographic viewing volume where the full display can be observed without vignetting (e.g., an ideal viewing volume). As the field of view of the display increases, the convergence point of ray 256 and ray 257 will be closer to the display. Thus, a display having a larger field of view allows a viewer 280 to see the full display at a closer viewing distance. Additionally, ray 256 and 257 may form an ideal holographic object volume. Holographic objects presented in an ideal holographic object volume can be seen anywhere in the viewing volume 285.

In some examples, holographic objects may be presented to only a portion of the viewing volume 285. In other words, holographic object volumes may be divided into any number of viewing sub-volumes (e.g., viewing sub-volume 290). Additionally, holographic objects can be projected outside of the holographic object volume 255. For example, holographic object 251 is presented outside of holographic object volume 255. Because the holographic object 251 is presented outside of the holographic object volume 255 it cannot be viewed from every location in the viewing volume 285. For example, holographic object 251 may be visible from a location in viewing sub-volume 290, but not visible from the location of the viewer 280.

Figure 2B:
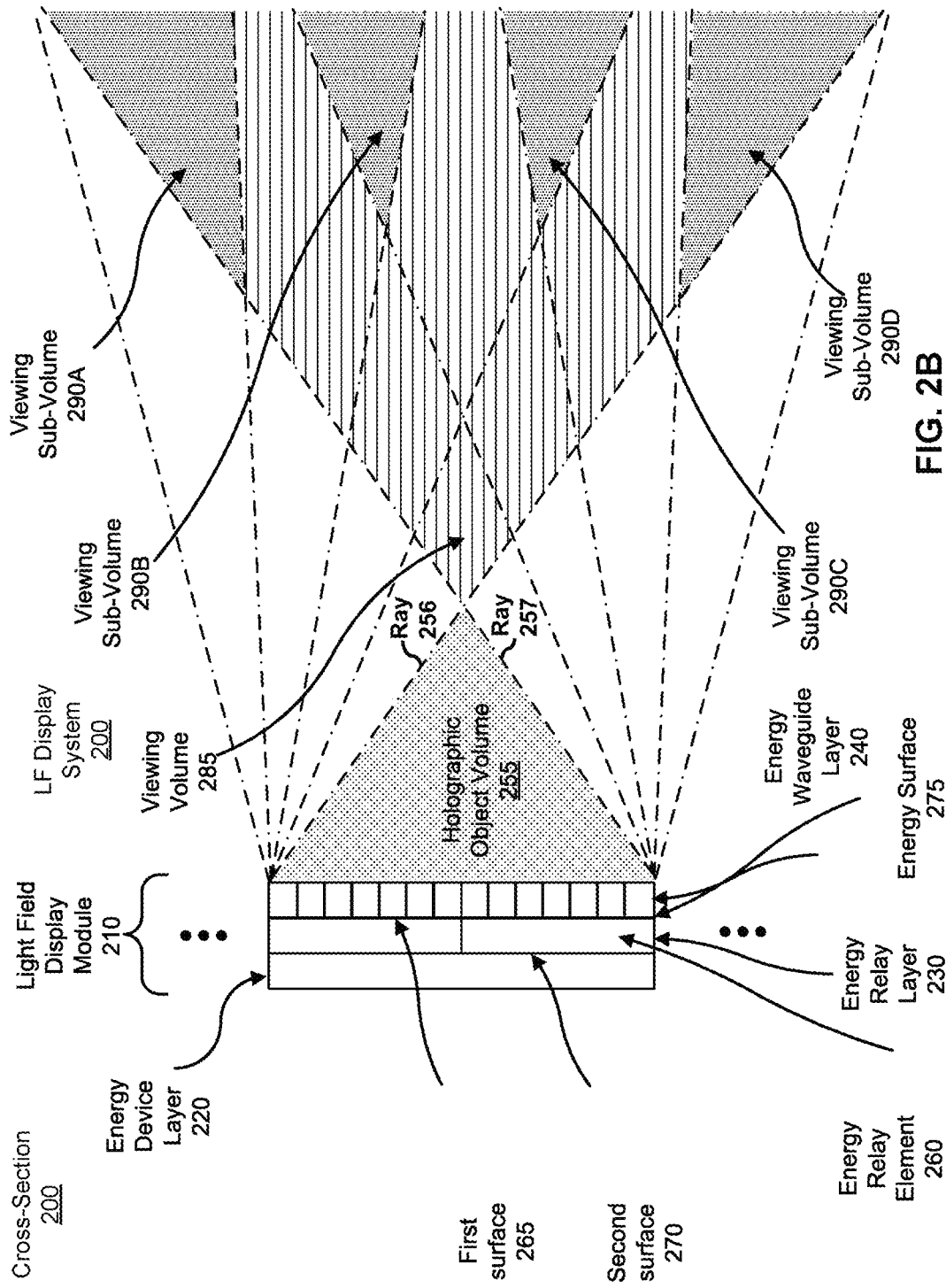
FIG. 2B is a cross section of a portion of a light field display module, in accordance with one or more embodiments.

For example, we turn to FIG. 2B to illustrate viewing holographic content from different viewing sub-volumes. FIG. 2B illustrates a cross section 200 of a portion of a LF display module, in accordance with one or more embodiments. The cross-section of FIG. 2B is the same as the cross-section of FIG. 2A. However, FIG. 2B illustrates a different set of light rays projected from the LF display module 210. Ray 256 and ray 257 still form a holographic object volume 255 and a viewing volume 285. However, as shown, rays projected from the top of the LF display module 210 and the bottom of the LF display module 210 overlap to form various viewing sub-volumes (e.g., view sub-volumes 290A, 290B, 290C, and 290D) within the viewing volume 285. A viewer in the first viewing sub-volume (e.g., 290A) may be able to perceive holographic content presented in the holographic object volume 255 that viewers in the other viewing sub-volumes (e.g., 290B, 290C, and 290D) are unable to perceive.

More simply, as illustrated in FIG. 2A, holographic object volume 255 is a volume in which holographic objects may be presented by LF display system such that they may be perceived by viewers (e.g., viewer 280) in viewing volume 285. In this way, the viewing volume 285 is an example of an ideal viewing volume, while the holographic object volume 255 is an example of an ideal object volume. However, in various configurations, viewers may perceive holographic objects presented by LF display system 200 in other example holographic object volumes such that viewers in other example viewing volumes may perceive the holographic content. More generally, an "eye-line guideline" applies when viewing holographic content projected from an LF display module. The eye-line guideline asserts that the line formed by a viewer's eye position and a holographic object being viewed must intersect a LF display surface.

When viewing holographic content presented by the LF display module 210, each eye of the viewer 280 sees a different perspective of the holographic object 250 because the holographic content is presented according to a 4D light field function. Moreover, as the viewer 280 moves within the viewing volume 285 he/she would also see different perspectives of the holographic object 250 as would other viewers within the viewing volume 285. As will be appreciated by one of ordinary skill in the art, a 4D light field function is well known in the art and will not be elaborated further herein.

As described in more detail herein, in some embodiments, the LF display can project more than one type of energy. For example, the LF display may project two types of energy, such as, for example, mechanical energy and electromagnetic energy. In this configuration, energy relay layer 230 includes two separate energy relays which are interleaved together at the energy surface 275, but are separated such that the energy is relayed to two different energy device layers 220. Here, one relay may be configured to transport electromagnetic energy, while another relay may be configured to transport mechanical energy. In some embodiments, the mechanical energy may be projected from locations between the electromagnetic waveguide elements on the energy waveguide layer 240, helping form structures that inhibit light from being transported from one electromagnetic waveguide element to another. In some embodiments, the energy waveguide layer 240 may also include waveguide elements that transport focused ultrasound along specific propagation paths in accordance with display instructions from a controller.

Note that in alternate embodiments (not shown), the LF display module 210 does not include the energy relay layer 230. In this case, the energy surface 275 is an emission surface formed using one or more adjacent electronic displays within the energy device layer 220. And in some embodiments, a separation between edges of adjacent electronic displays is less than a minimum perceptible contour as defined by a visual acuity of a human eye having 20/40 vision, such that the energy surface is effectively seamless from the perspective of the viewer 280 within the viewing volume 285.

LF Display Modules

Figure 3A:
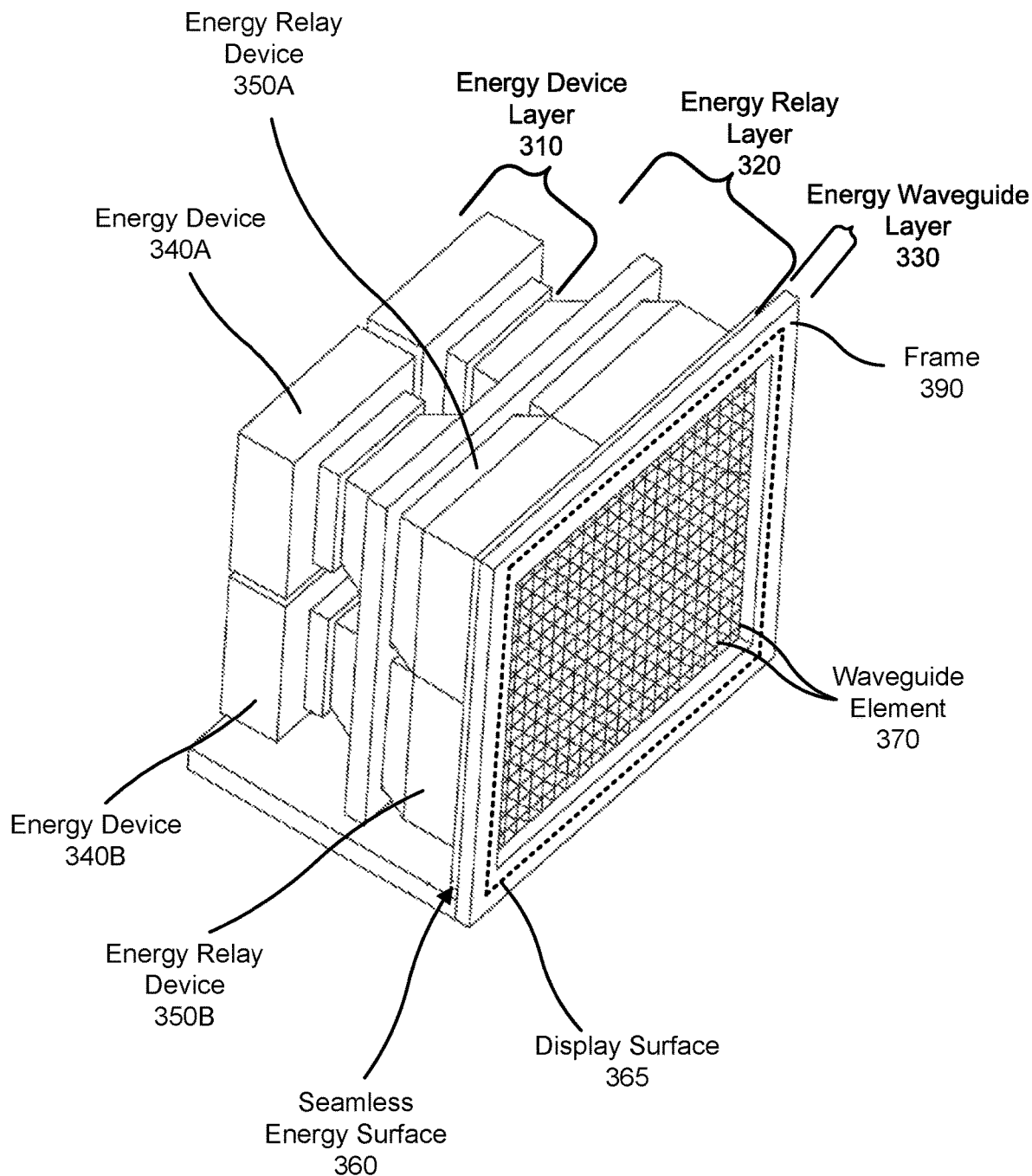
FIG. 3A is a perspective view of a light field display module, in accordance with one or more embodiments.

FIG. 3A is a perspective view of a LF display module 300A, in accordance with one or more embodiments. The LF display module 300A may be the LF display module 110 and/or the LF display module 210. In other embodiments, the LF display module 300A may be some other LF display module. In the illustrated embodiment, the LF display module 300A includes an energy device layer 310, and energy relay layer 320, and an energy waveguide layer 330. The LF display module 300A is configured to present holographic content from a display surface 365 as described herein. For convenience, the display surface 365 is illustrated as a dashed outline on the frame 390 of the LF display module 300A, but is, more accurately, the surface directly in front of waveguide elements bounded by the inner rim of the frame 390. The display surface 365 includes a plurality of projection locations from which energy can be projected. Some embodiments of the LF display module 300A have different components than those described here. For example, in some embodiments, the LF display module 300A does not include the energy relay layer 320. Similarly, the functions can be distributed among the components in a different manner than is described here.

The energy device layer 310 is an embodiment of the energy device layer 220. The energy device layer 310 includes four energy devices 340 (three are visible in the figure). The energy devices 340 may all be the same type (e.g., all electronic displays), or may include one or more different types (e.g., includes electronic displays and at least one acoustic energy device).

The energy relay layer 320 is an embodiment of the energy relay layer 230. The energy relay layer 320 includes four energy relay elements 350 (three are visible in the figure). The energy relay devices 350 may all relay the same type of energy (e.g., light), or may relay one or more different types (e.g., light and sound). Each of the relay elements 350 includes a first surface and a second surface, the second surface of the energy relay elements 350 being arranged to form a singular seamless energy surface 360. In the illustrated embodiment, each of the energy relay elements 350 are tapered such that the first surface has a smaller surface area than the second surface, which allows accommodation for the mechanical envelopes of the energy devices 340 on the small end of the tapers. This also allows the seamless energy surface to be borderless, since the entire area can project energy. This means that this seamless energy surface can be tiled by placing multiple instances of 300 together, without dead space or bezels, so that the entire combined surface is seamless. In other embodiments, the first surface and the second surface have the same surface area.

The energy waveguide layer 330 is an embodiment of the energy waveguide layer 240. The energy waveguide layer 330 includes a plurality of waveguide elements 370. As discussed above with respect to FIG. 2, the energy waveguide layer 330 is configured to direct energy from the seamless energy surface 360 along specific propagation paths in accordance with a 4D light field function to form a holographic object. Note that in the illustrated embodiment the energy waveguide layer 330 is bounded by a frame 390. In other embodiments, there is no frame 390 and/or a thickness of the frame 390 is reduced. Removal or reduction of thickness of the frame 390 can facilitate tiling the LF display module 300A with additional LF display modules 300.

Note that in the illustrated embodiment, the seamless energy surface 360 and the energy waveguide layer 330 are planar. In alternate embodiments, not shown, the seamless energy surface 360 and the energy waveguide layer 330 may be curved in one or more dimensions.

The LF display module 300A can be configured with additional energy sources that reside on the surface of the seamless energy surface, and allow the projection of an energy field in additional to the light field. In one embodiment, an acoustic energy field may be projected from electrostatic speakers (not illustrated) mounted at any number of locations on the seamless energy surface 360. Further, the electrostatic speakers of the LF display module 300A are positioned within the light field display module 300A such that the dual-energy surface simultaneously projects sound fields and holographic content. For example, the electrostatic speakers may be formed with one or more diaphragm elements that are transmissive to some wavelengths of electromagnetic energy, and driven with conductive elements. The electrostatic speakers may be mounted on to the seamless energy surface 360, so that the diaphragm elements cover some of the waveguide elements. The conductive electrodes of the speakers may be co-located with structures designed to inhibit light transmission between electromagnetic waveguides, and/or located at positions between electromagnetic waveguide elements (e.g., frame 390). In various configurations, the speakers can project an audible sound and/or many sources of focused ultrasonic energy that produces a haptic surface.

In some configurations an energy device 340 may sense energy. For example, an energy device may be a microphone, a light sensor, an acoustic transducer, etc. As such, the energy relay devices may also relay energy from the seamless energy surface 360 to the energy device layer 310. That is, the seamless energy surface 360 of the LF display module forms a bidirectional energy surface when the energy devices and energy relay devices 340 are configured to simultaneously emit and sense energy (e.g., emit light fields and sense sound).

More broadly, an energy device 340 of a LF display module 340 can be either an energy source or an energy sensor. The LF display module 300A can include various types of energy devices that act as energy sources and/or energy sensors to facilitate the projection of high quality holographic content to a user. Other sources and/or sensors may include thermal sensors or sources, infrared sensors or sources, image sensors or sources, mechanical energy transducers that generate acoustic energy, feedback sources, etc. Many other sensors or sources are possible. Further, the LF display modules can be tiled such that the LF display module can form an assembly that projects and senses multiple types of energy from a large aggregate seamless energy surface In various embodiments of LF display module 300A, the seamless energy surface 360 can have various surface portions where each surface portion is configured to project and/or emit specific types of energy. For example, when the seamless energy surface is a dual-energy surface, the seamless energy surface 360 includes one or more surface portions that project electromagnetic energy, and one or more other surface portions that project ultrasonic energy. The surface portions that project ultrasonic energy may be located on the seamless energy surface 360 between waveguide elements, and/or co-located with structures designed to inhibit light transmission between waveguide elements. In an example where the seamless energy surface is a bidirectional energy surface, the energy relay layer 320 may include two types of energy relay devices interleaved at the seamless energy surface 360. In various embodiments, the seamless energy surface 360 may be configured such that portions of the surface under particular waveguide elements 370 are all energy sources, all energy sensors, or a mix of energy sources and energy sensors.

Figure 3B:
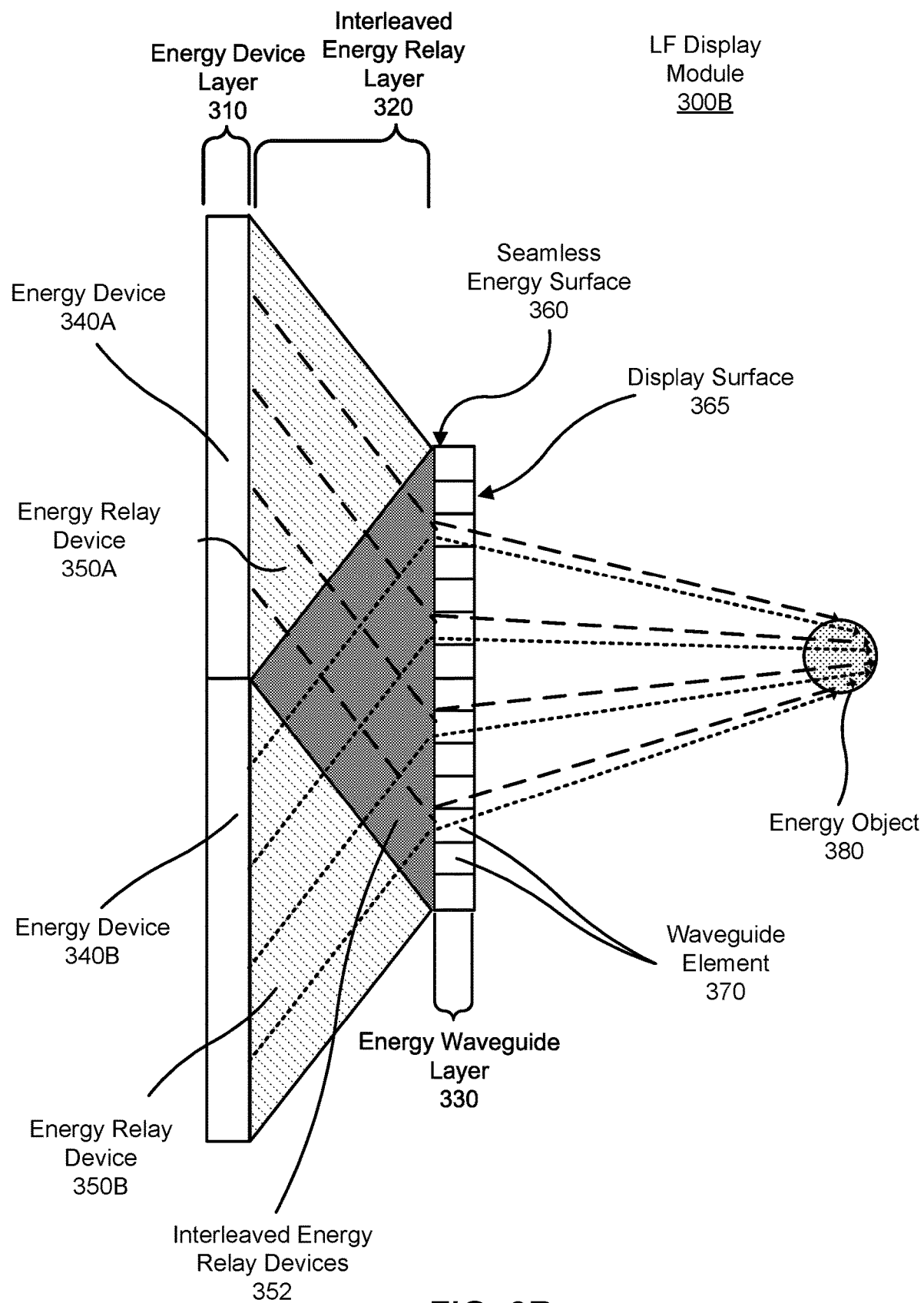
FIG. 3B is a cross-sectional view of a light field display module which includes interleaved energy relay devices, in accordance with one or more embodiments.

FIG. 3B is a cross-sectional view of a LF display module 300B which includes interleaved energy relay devices, in accordance with one or more embodiments. Energy relay device 350A transports energy between the energy relay first surface 345A connected to energy device 340A, and the seamless energy surface 360. Energy relay 350B transports energy between the energy relay first surface 345B connected to energy device 340B, and the seamless energy surface 360. Both relay devices are interleaved at interleaved energy relay device 352, which is connected to the seamless energy surface 360. In this configuration, surface 360 contains interleaved energy locations of both energy devices 340A and 340B, which may be energy sources or energy sensors. Accordingly, the LF display module 300B may be configured as either a dual energy projection device for projecting more than one type of energy, or as a bidirectional energy device for simultaneously projecting one type of energy and sensing another type of energy. The LF display module 300B may be the LF display module 110 and/or the LF display module 210. In other embodiments, the LF display module 302 may be some other LF display module.

The LF display module 300B includes many components similarly configured to those of LF display module 300A in FIG. 3A. For example, in the illustrated embodiment, the LF display module 300B includes an energy device layer 310, energy relay layer 320, a seamless energy surface 360, and an energy waveguide layer 330 including at least the same functionality of those described in regards to FIG. 3A. Additionally, the LF display module 300B may present and/or receive energy from the display surface 365. Notably, the components of the LF display module 300B are alternatively connected and/or oriented than those of the LF display module 300A in FIG. 3A. Some embodiments of the LF display module 300B have different components than those described here. Similarly, the functions can be distributed among the components in a different manner than is described here. FIG. 3B illustrates the design of a single LF display module 302 that may be tiled to produce a dual energy projection surface or a bidirectional energy surface with a larger area.

In an embodiment, the LF display module 300B is a LF display module of a bidirectional LF display system. A bidirectional LF display system may simultaneously project energy and sense energy from the display surface 365. The seamless energy surface 360 contains both energy projecting and energy sensing locations that are closely interleaved on the seamless energy surface 360. Therefore, in the example of FIG. 3B, the energy relay layer 320 is configured in a different manner than the energy relay layer of FIG. 3A. For convenience, the energy relay layer of LF display module 300B will be referred to herein as the "interleaved energy relay layer."

The interleaved energy relay layer 320 includes two legs: a first energy relay device 350A and a second energy relay device 350B. Each of the legs are illustrated as a lightly shaded area. Each of the legs may be made of a flexible relay material, and formed with a sufficient length to use with energy devices of various sizes and shapes. In some regions of the interleaved energy relay layer, the two legs are tightly interleaved together as they approach the seamless energy surface 360. In the illustrated example, the interleaved energy relay devices 352 are illustrated as a darkly shaded area.

While interleaved at the seamless energy surface 360, the energy relay devices are configured to relay energy to/from different energy devices. The energy devices are at energy device layer 310. As illustrated, energy device 340A is connected to energy relay device 350A and energy device 340B is connected to energy relay device 350B. In various embodiments, each energy device may be an energy source or energy sensor.

An energy waveguide layer 330 includes waveguide elements 370 to steer energy waves from the seamless energy surface 360 along projected paths towards a series of convergence points. In this example, a holographic object 380 is formed at the series of convergence points. Notably, as illustrated, the convergence of energy at the holographic object 380 occurs on the viewer side of the display surface 365. However, in other examples, the convergence of energy may be anywhere in the holographic object volume, which extends both in front of the display surface 365 and behind the display surface 365. The waveguide elements 370 can simultaneously steer incoming energy to an energy device (e.g., an energy sensor), as described below.

In one example embodiment of LF display module 300B, an emissive display is used as an energy source and an imaging sensor is used as an energy sensor. In this manner, the LF display module 300B can simultaneously project holographic content and detect light from the volume in front of the display surface 365. In this manner, this embodiment of the LF display module 300B functions as both a LF display and an LF sensor.

In an embodiment, the LF display module 300B is configured to simultaneously project a light field in front of the display surface 365 and capture a light field from the front of the display surface 365. In this embodiment, the energy relay device 350A connects a first set of locations at the seamless energy surface 360 positioned under the waveguide elements 370 to an energy device 340A. In an example, energy device 340A is an emissive display having an array of source pixels. The energy relay device 340B connects a second set of locations at the seamless energy surface 360 positioned under waveguide elements 370 to an energy device 340B. In an example, the energy device 340B is an imaging sensor having an array of sensor pixels. The LF display module 302 may be configured such that the locations at the seamless energy surface 365 that are under a particular waveguide element 370 are all emissive display locations, all imaging sensor locations, or some combination of locations. In other embodiments, the bidirectional energy surface can project and receive various other forms of energy.

In another example embodiment of the LF display module 300B, the LF display module is configured to project two different types of energy. For example, energy device 340A is an emissive display configured to emit electromagnetic energy and energy device 340B is an ultrasonic transducer configured to emit mechanical energy. As such, both light and sound can be projected from various locations at the seamless energy surface 360. In this configuration, energy relay device 350A connects the energy device 340A to the seamless energy surface 360 and relays the electromagnetic energy. The energy relay device is configured to have properties (e.g. varying refractive index) which make it efficient for transporting electromagnetic energy. Energy relay device 350B connects the energy device 340B to the seamless energy surface 360 and relays mechanical energy. Energy relay device 350B is configured to have properties for efficient transport of ultrasound energy (e.g. distribution of materials with different acoustic impedance). In some embodiments, the mechanical energy may be projected from locations between the waveguide elements 370 on the energy waveguide layer 330. The locations that project mechanical energy may form structures that serve to inhibit light from being transported from one electromagnetic waveguide element to another. In one example, a spatially separated array of locations that project ultrasonic mechanical energy can be configured to create three-dimensional haptic shapes and surfaces in mid-air. The surfaces may coincide with projected holographic objects (e.g., holographic object 380). In some examples, phase delays and amplitude variations across the array can assist in creating the haptic shapes.

In various embodiments, the bidirectional LF display module 302 may include multiple energy device layers with each energy device layer including a specific type of energy device. In these examples, the energy relay layers are configured to relay the appropriate type of energy between the seamless energy surface 360 and the energy device layer 330.

Tiled LF Display Modules

Figure 4A:
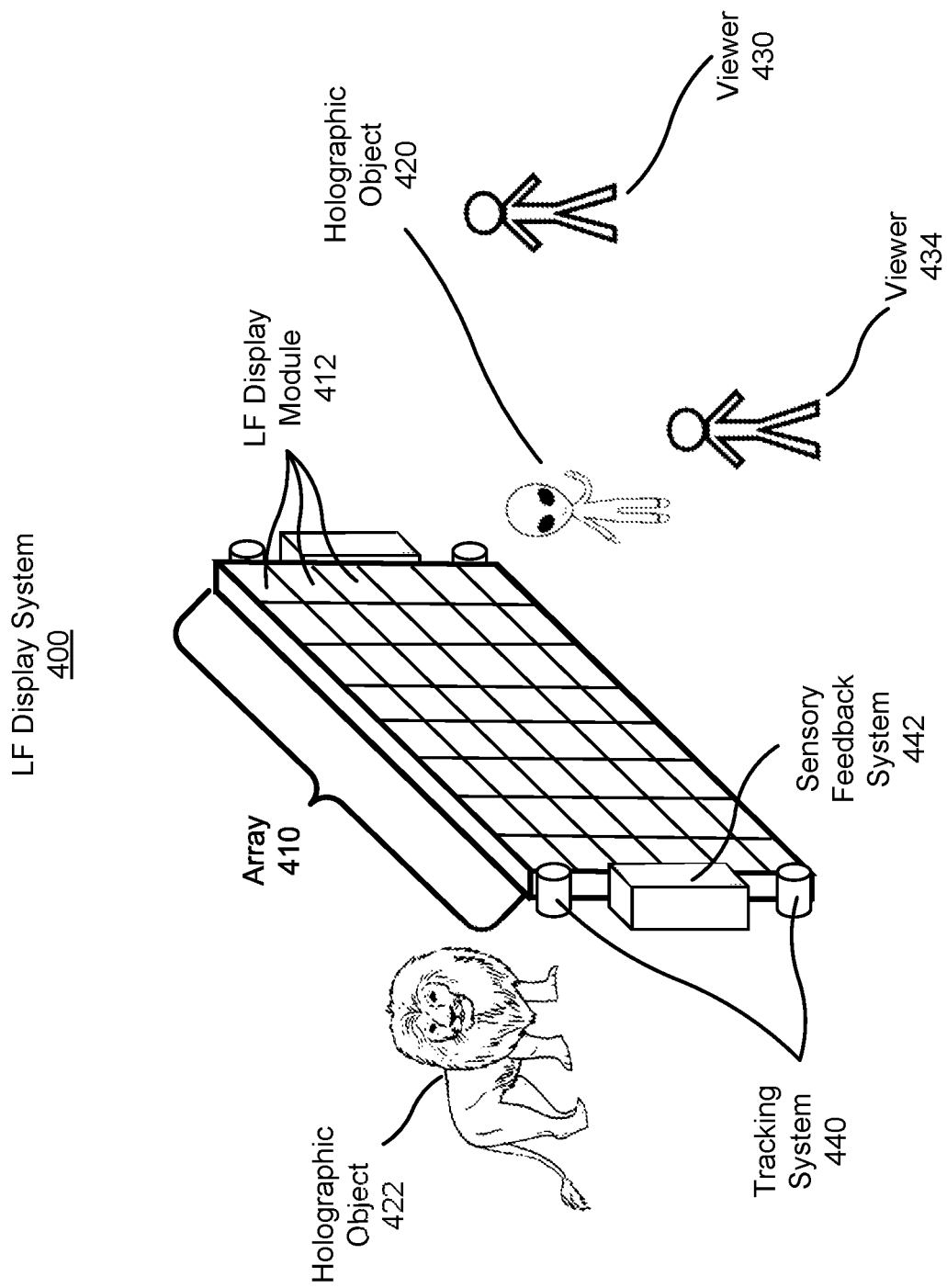
FIG. 4A is a perspective view of portion of a light field display system that is tiled in two dimensions to form a single-sided seamless surface environment, in accordance with one or more embodiments.

FIG. 4A is a perspective view of a portion of LF display system 400 that is tiled in two dimensions to form a single-sided seamless surface environment, in accordance with one or more embodiments. The LF display system 400 includes a plurality of LF display modules that are tiled to form an array 410. More explicitly, each of the small squares in the array 410 represents a tiled LF display module 412. The array 410 may cover, for example, some or all of a surface.

The array 410 may project one or more holographic objects. For example, in the illustrated embodiment the array 410 projects a holographic object 420 and a holographic object 430. Tiling of the LF display modules allows for a much larger viewing volume as well as allows for objects to be projected out farther distances from the array 410. For example, in the illustrated embodiment, the viewing volume is, approximately, the entire area in front of and behind the array 410 rather than a localized volume in front of (and behind) a LF display module 412.

In some embodiments, the LF display system 400 presents the holographic object 420 to a viewer 430 and a viewer 434. The viewer 430 and the viewer 434 receive different perspectives of the holographic object 420. For example, the viewer 430 is presented with a direct view of the holographic object 420, whereas the viewer 434 is presented with a more oblique view of the holographic object 430. As the viewer 430 and/or the viewer 434 move, they are presented with different perspectives of the holographic object 420. This allows a viewer to visually interact with a holographic object by moving relative to the holographic object. For example, as the viewer 430 walks around a holographic object 420, the viewer 430 sees different sides of the holographic object 420 as long as the holographic object 420 remains in the holographic object volume of the array 410. Accordingly, the viewer 430 and the viewer 434 may simultaneously see the holographic object 420 in real-world space as if it is truly there. Additionally, the viewer 440 and the viewer 450 of the holographic object 420 do not need to wear an external device in order to see the holographic object 420, as the holographic object 420 is visible to viewers in much the same way a physical object would be visible. Additionally, here, the holographic object 422 is illustrated behind the array because the viewing volume of the array extends behind the surface of the array. In this manner, the holographic object 422 may be presented to the viewer 430 and/or viewer 434.

In some embodiments, the LF display system 400 may include a tracking system that tracks positions of the viewer 430 and the viewer 434. In some embodiments, the tracked position is the position of a viewer. In other embodiments, the tracked position is that of the eyes of a viewer. The position tracking of the eye is different from gaze tracking which tracks where an eye is looking (e.g., uses orientation to determine gaze location). The eyes of the viewer 430 and the eyes of the viewer 434 are in different locations.

In various configurations, the LF display system 400 may include one or more tracking systems. For example, in the illustrated embodiment of FIG. 4A, LF display system includes a tracking system 440 that is external to the array 410. Here, the tracking system may be a camera system coupled to the array 410. External tracking systems are described in more detail in regards to FIG. 5A. In other example embodiments, the tracking system may be incorporated into the array 410 as described herein. For example, an energy device (e.g., energy device 340) of a LF display module 412 included in the array 410 may be configured to capture images of viewers in front of the array 440. In whichever case, the tracking system(s) of the LF display system 400 determines tracking information about the viewers (e.g., viewer 430 and/or viewer 434) viewing holographic content presented by the array 410.

Tracking information describes a position in space (e.g., relative to the tracking system) for the position of a viewer, or a position of a portion of a viewer (e.g. one or both eyes of a viewer, or the extremities of a viewer). A tracking system may use any number of depth determination techniques to determine tracking information. The depth determination techniques may include, e.g., structured light, time of flight, stereo imaging, some other depth determination technique, or some combination thereof. The tracking system may include various systems configured to determine tracking information. For example, the tracking system may include one or more infrared sources (e.g., structured light sources), one or more imaging sensors that can capture images in the infrared (e.g., red-blue-green-infrared camera), and a processor executing tracking algorithms. The tracking system may use the depth estimation techniques to determine positions of viewers. In some embodiments, the LF display system 400 generates holographic objects based on tracked positions of the viewer 430 and/or the viewer 434. For example, the LF display system 400 may generate a holographic object responsive to a viewer coming within a threshold distance of the array 410 and/or a particular position.

The LF display system 400 may present one or more holographic objects that are customized to each viewer based in part on the tracking information. For example, the viewer 430 may be presented with the holographic object 420, but not the holographic object 422. And the viewer 434 may be presented with the holographic object 422, but not the holographic object 420. For example, the LF display system 400 tracks a position of each of the viewer 430 and the viewer 434. The LF display system 400 determines a perspective of a holographic object that should be visible to a viewer based on their relative position to where the holographic object is to be presented. The LF display system 400 selectively projects light from specific pixels that correspond to the determined perspective. Accordingly, the viewer 434 and the viewer 430 can simultaneously have experiences that are, potentially, completely different. In other words, the LF display system 400 may present holographic content to viewing sub-volumes of the viewing volume (i.e., similar to the viewing sub-volumes 290A, 290B, 290C, and 290D shown in FIG. 2B). For example, as illustrated, because the LF display system 400 can track the position of the viewer 430, the LF display system 400 may present space content (e.g., holographic object 420) to a viewing sub-volume surrounding the viewer 430 and safari content (e.g., holographic object 422) to a viewing sub-volume surrounding the viewer 434. In contrast, conventional systems would have to use individual headsets to provide a similar experience.

In some embodiments, the LF display system 400 may include one or more sensory feedback systems. The sensory feedback systems provide other sensory stimuli (e.g., tactile, audio, pressure, force, or smell/olfactory) that augment the holographic objects 420 and 422. For example, in the illustrated embodiment of FIG. 4A, the LF display system 400 includes a sensory feedback system 442 external to the array 410. In one example, the sensory feedback system 442 may be an electrostatic speaker coupled to the array 410. External sensory feedback systems are described in more detail in regards to FIG. 5A. In other example embodiments, the sensory feedback system may be incorporated into the array 410 as described herein. For example, an energy device (e.g., energy device 340A in FIG. 3B) of a LF display module 412 included in the array 410 may be configured to project ultrasonic energy to viewers in front of the array and/or receive imaging information from viewers in front of the array. In whichever case, the sensory feedback system presents and/or receives sensory content to/from the viewers (e.g., viewer 430 and/or viewer 434) viewing holographic content (e.g., holographic object 420 and/or holographic objected 422) presented by the array 410.

The LF display system 400 may include a sensory feedback system that includes one or more acoustic projection devices external to the array. Alternatively or additionally, the LF display system 400 may include one or more acoustic projection devices integrated into the array 410 as described herein. The acoustic projection devices may consist of an array of ultrasonic sources configured to project a volumetric tactile surface. In some embodiments, the volumetric surface may be projected to be coincident with a holographic object. In some embodiments, the volumetric tactile surface may be projected within a threshold distance of a holographic object. In some embodiments, the tactile surface may be coincident with a holographic object (e.g., at a surface of the holographic object 420) for one or more surfaces of a holographic object if a portion of a viewer gets within a threshold distance of the one or more surfaces. The volumetric tactile sensation allows the user to touch and feel surfaces of the holographic object. The plurality of acoustic projection devices may also project an audible pressure wave that provides audio content (e.g., immersive audio) to viewers. Accordingly, the ultrasonic pressure waves and/or the audible pressure waves can act to complement a holographic object.

In various embodiments, the LF display system 400 may provide other sensory stimuli based in part on a tracked position of a viewer. For example, the holographic object 422 illustrated in FIG. 4A is a lion, and the LF display system 400 may have the holographic object 422 roar both visually (i.e., the holographic object 430 appears to roar) and audibly (i.e., one or more acoustic projection devices project a pressure wave that the viewer 430 perceives as a lion's roar emanating from the holographic object 422.

Note that, in the illustrated configuration, the holographic viewing volume may be limited in a manner similar to the viewing volume 285 of the LF display system 200 in FIG. 2. This can limit the amount of perceived immersion that a viewer will experience with a single device. One way to address this is to use multiple LF display modules that are tiled along multiple sides as described below with respect to FIG. 4B.

Figure 4B:
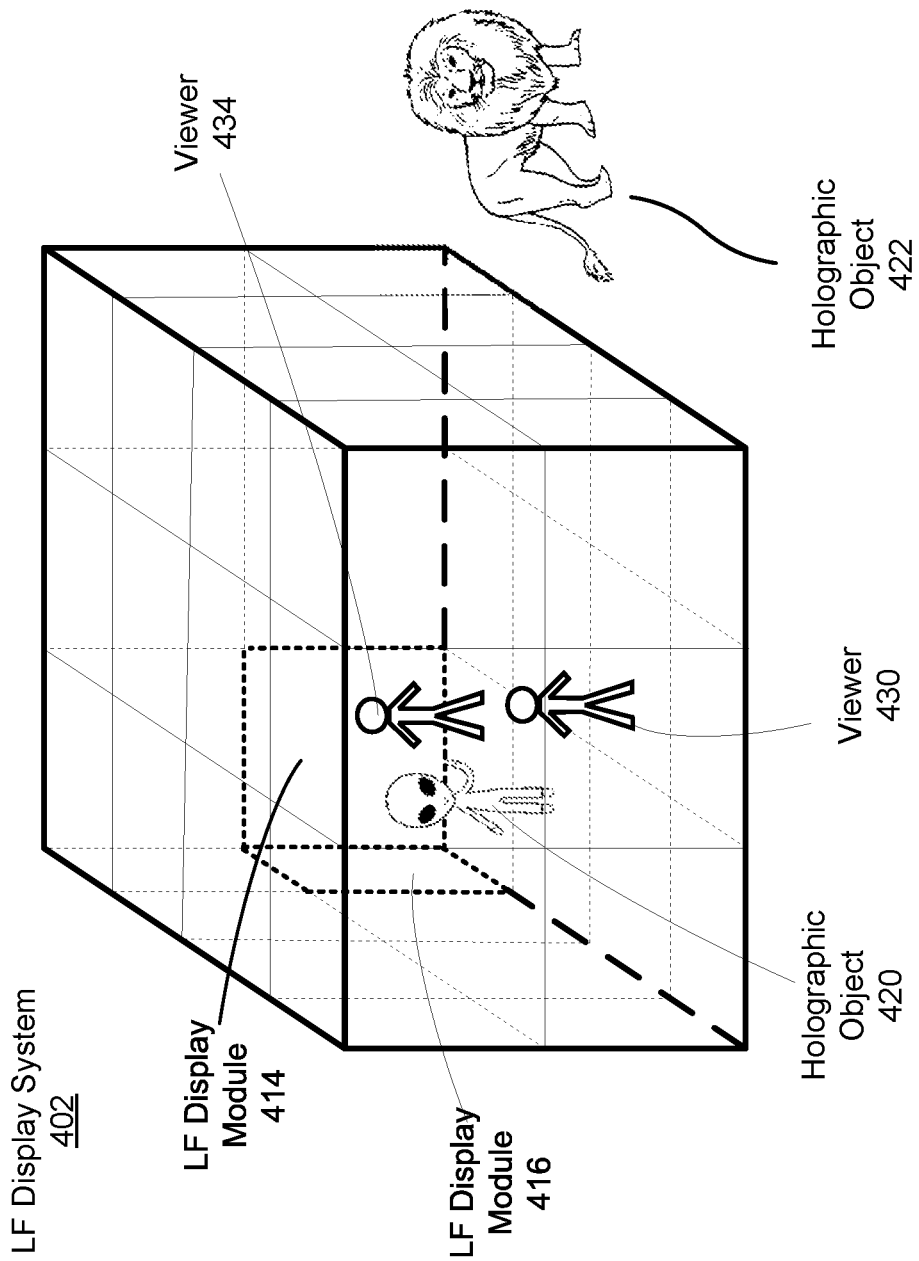
FIG. 4B is a perspective view of a portion of light field display system in a multi-sided seamless surface environment, in accordance with one or more embodiments.

FIG. 4B is a perspective view of a portion of a LF display system 402 in a multi-sided seamless surface environment, in accordance with one or more embodiments. The LF display system 402 is substantially similar to the LF display system 400 except that the plurality of LF display modules are tiled to create a multi-sided seamless surface environment. More specifically, the LF display modules are tiled to form an array that is a six-sided aggregated seamless surface environment. In other embodiments, the plurality of LF display modules may cover some, but not all, of a surface, or some combination thereof. In other embodiments, a plurality of LF display modules are tiled to form some other aggregated seamless surface. For example, the surfaces may be curved such that a cylindrical aggregated energy environment is formed.

The LF display system 402 may project one or more holographic objects. For example, in the illustrated embodiment the LF display system 402 projects the holographic object 420 into an area enclosed by the six-sided aggregated seamless surface environment. In this example, the viewing volume of the LF display system is also contained within the six-sided aggregated seamless surface environment. Note that, in the illustrated configuration, the viewer 432 may be positioned between the holographic object 420 and a LF display module 414 that is projecting energy (e.g., light and/or pressure waves) that is used to form the holographic object 420. Accordingly, the positioning of the viewer 434 may prevent the viewer 430 from perceiving the holographic object 420 formed from energy from the LF display module 414. However, in the illustrated configuration there is at least one other LF display module, e.g., a LF display module 416, that is unobstructed (e.g., by the viewer 434) and can project energy to form the holographic object 420. In this manner, occlusion by viewers in the space can cause some portion of the holographic projections to disappear, but the effect is much less than if only one side of the volume was populated with holographic display panels. Holographic object 422 is illustrated "outside" the enclosure of the six-sided aggregated seamless surface environment because the holographic object volume extends behind the aggregated surface. Thus, the viewer 430 and/or the viewer 434 can perceive the holographic object 422 as "outside" of a six-sided environment.

As described above in reference to FIG. 4A, in some embodiments, the LF display system 402 actively tracks positions of viewers and may dynamically instruct different LF display modules to present holographic content based on the tracked positions. Accordingly, a multi-sided configuration can provide a more robust environment (e.g., relative to FIG. 4A) for providing holographic objects where unconstrained viewers are free to move throughout the area enclosed by the multi-sided seamless surface environment.

Notably, various LF display systems may have different configurations. Further, each configuration may have a particular orientation of surfaces that, in aggregate, form a seamless display surface ("aggregate surface"). That is, the LF display modules of a LF display system can be tiled to form a variety of aggregate surfaces. For example, in FIG. 4B, the LF display system 402 includes LF display modules tiled to form a six-sided aggregate surface. In some other examples, an aggregate surface may only occur on a portion of a surface rather than a whole surface. Some examples are described herein.

In some configurations, the aggregate surface of a LF display system may include an aggregate surface configured to project energy towards a localized viewing volume. Projecting energy to a localized viewing volume allows for a higher quality viewing experience by, for example, increasing the density of projected energy in a specific viewing volume, increasing the FOV for the viewers in that volume, and bringing the viewing volume closer to the display surface.

Figure 4C:
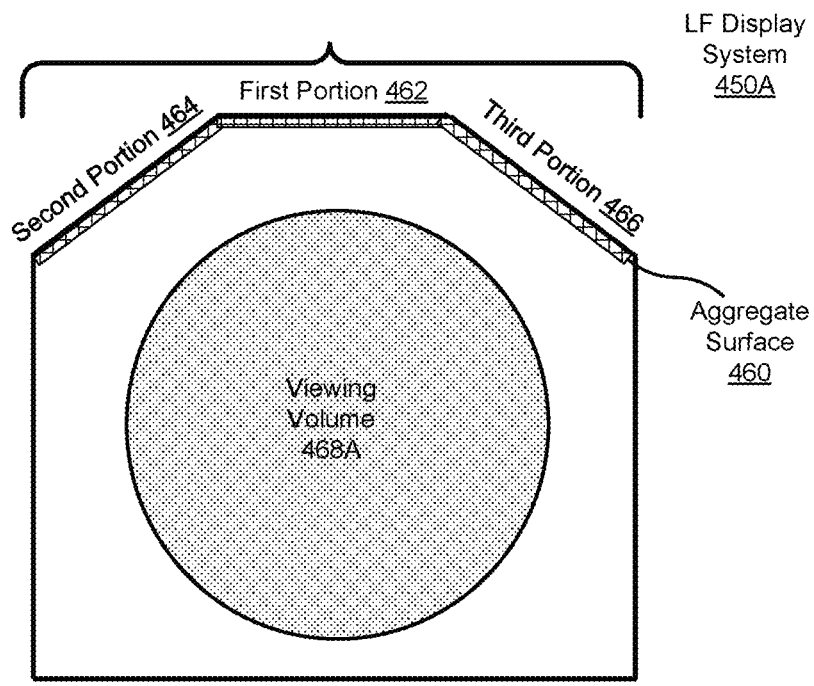
FIG. 4C is a top-down view of a light field display system with an aggregate surface in a winged configuration, in accordance with one or more embodiments.
Figure 4D:
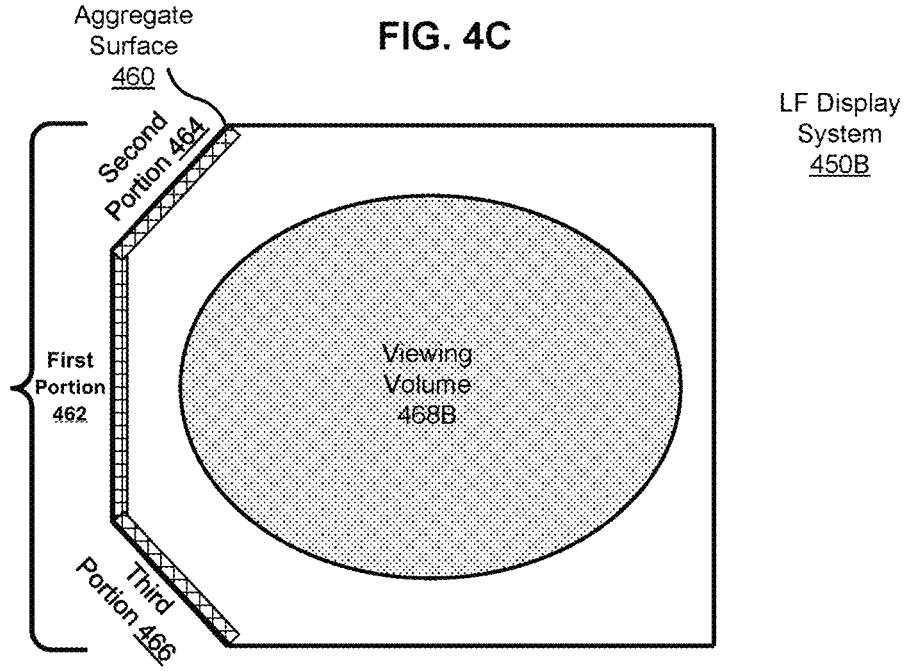
FIG. 4D is a side view of a light field display system with an aggregate surface in a sloped configuration, in accordance with one or more embodiments.

For example, FIG. 4C illustrates top down view of a LF display system 450A with an aggregate surface in a "winged" configuration. The LF display system 450A includes LF display modules tiled to form an aggregate surface 460. The LF Display system 450A has an aggregate surface 460 which includes three portions: (i) a first central portion 462, (ii) a second portion 464 connected to the first portion 462 and placed at an angle from the central portion to project energy towards the front of the central portion (i.e., a first side surface), and (iii) a third portion 466 connected the first portion 462 and placed at an angle from the central portion to project energy towards the front of the central portion (i.e., a second side surface). A mobile device may be designed with a configuration similar to that shown in FIG. 4C, such that the first central portion 462 is a primary display screen designed to face the viewer, and the second portion 464 and the third portion 466 are angled towards the viewer to partially surround the viewer. When the mobile device is held so that the first central portion is in a vertical plane with a horizontal and a vertical axis, the second and third portions are angled towards the front of the central portion along the horizontal axis.

In this example, the viewing volume 468A of the LF display system 450A lies in front of the device partially surrounded by the three portions of the aggregate surface 460. An aggregate surface that at least partially surrounds a viewer ("surrounding surface") increases the immersive experience of the viewers.

To illustrate, consider, for example, an aggregate surface with only a central surface. Referring to FIG. 2A, the rays that are projected from either end of the display surface create an ideal holographic volume and ideal viewing volumes as described above. Now consider, for example, if the central surface included two side surfaces angled towards the viewer. In this case, ray 256 and ray 257 would be projected at a greater angle from a normal of the central surface. Thus, the field of view of the viewing volume would increase. Similarly, the holographic viewing volume would be nearer the display surface. Additionally, because the two second and third portions tilted nearer the viewing volume, the holographic objects that are projected at a fixed distance from the display surface are closer to that viewing volume.

To simplify, a display surface with only a central surface has a planar field of view, a planar threshold separation between the (central) display surface and the viewing volume, and a planar proximity between a holographic object and the viewing volume. Adding one or more side surfaces angled towards the viewer increases the field of view relative to the planar field of view, decreases the separation between the display surface and the viewing volume relative to the planar separation, and increases the proximity between the display surface and a holographic object relative to the planar proximity. Further angling the side surfaces towards the viewer further increases the field of view, decreases the separation, and increases the proximity. In other words, the angled placement of the side surfaces increases the immersive experience for viewers.

Additionally, as described below in regards to FIG. 6, deflection optics may be used to optimize the size and position of the viewing volume for LF display parameters (e.g., dimensions and FOV).

Returning to FIG. 4D, in a similar example, FIG. 4D illustrates a side view of a LF display system 450B with an aggregate surface in a "sloped" configuration. The LF display system 450B includes LF display modules tiled to form an aggregate surface 460. The aggregate surface 460 includes three portions: (i) a first portion 462 (i.e., a central surface), (ii) a second portion 464 connected to the first portion 462, and placed at an angle from the central portion to project energy towards the front of the central portion (i.e., a first side surface), and (iii) a third portion 464 connected to the first portion 462, and placed at an angle from the central portion to project energy towards the front of the central portion (i.e., a second side surface). A mobile device may be designed with a configuration similar to that shown in FIG. 4D, such that the first central portion 462 is a primary display screen designed to face the viewer, and the second portion 464 and the third portion 466 are angled towards the viewer to partially surround the viewer. When the mobile device is held so that the first portion is a vertical plane with a horizontal and a vertical axis, the second and third portions are angled towards the front of the central portion along the vertical axis.

In this example, the viewing volume 468B of the LF display system 450B is in front of the central portion and partially surrounded by the three portions of the aggregate surface 460. Similar to the configuration shown in FIG. 4C, the two side portions (e.g., second portion 464, and third portion 466) are angled to surround the viewer and form a surrounding surface. The surrounding surface increases the viewing FOV from the perspective of any viewer in the holographic viewing volume 468B. Additionally, the surrounding surface allows the viewing volume 468B to be closer to the surface of the displays such that projected objects appear closer. In other words, the angled placement of the side surfaces increases the field of view, decreases the separation, and increases the proximity of the aggregate surface, thereby increasing the immersive experience for viewers. Further, as will be discussed below, deflection optics may be used to optimize the size and position of the viewing volume 468B.

The sloped configuration of the side portions of the aggregate surface 460 enables holographic content to be presented closer to the viewing volume 468B than if the third portion 466 was not sloped. For example, the lower extremities (e.g., legs) of a character presented form a LF display system in a sloped configuration may seem closer and more realistic than if a LF display system with a flat front display were used.

Additionally, the configuration of the LF display system and the environment which it is located may inform the shape and locations of the viewing volumes and viewing sub-volumes.

Figure 4E:
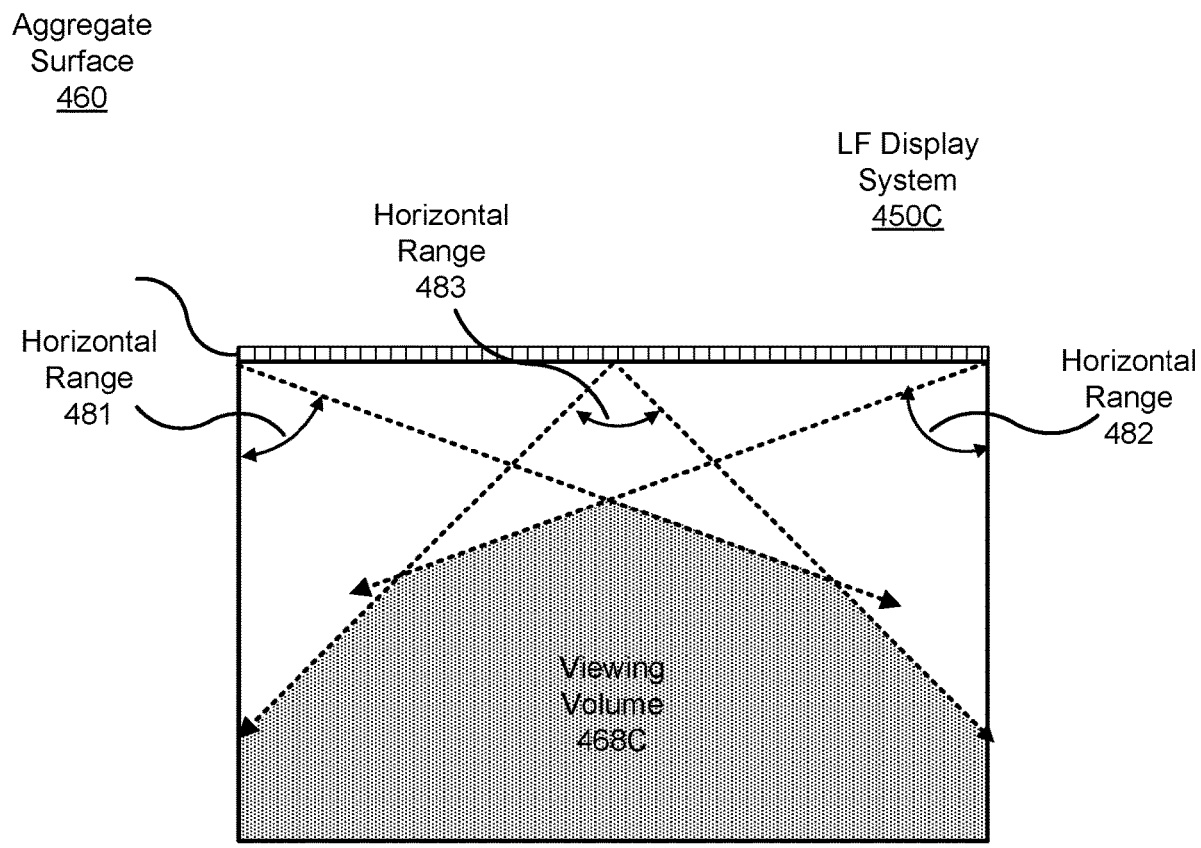
FIG. 4E is a top-down view of a light field display system with an aggregate surface on a front panel of a device, in accordance with one or more embodiments.

FIG. 4E, for example, illustrates a top down view of a LF display system 450C with an aggregate surface 460. The LF display system 450C projects various rays from the aggregate surface 460. The rays projected from the left side of the aggregate surface 460 have horizontal angular range 481, rays projected from the right side of the aggregate surface have horizontal angular range 482, and rays projected from the center of the aggregate surface 460 have horizontal angular range 483. In between these points, the projected rays may take on intermediate values of angle ranges. Having a gradient deflection angle in the projected rays across the display surface in this manner creates a viewing volume 468C.

Control of a LF Display System

Figure 5:
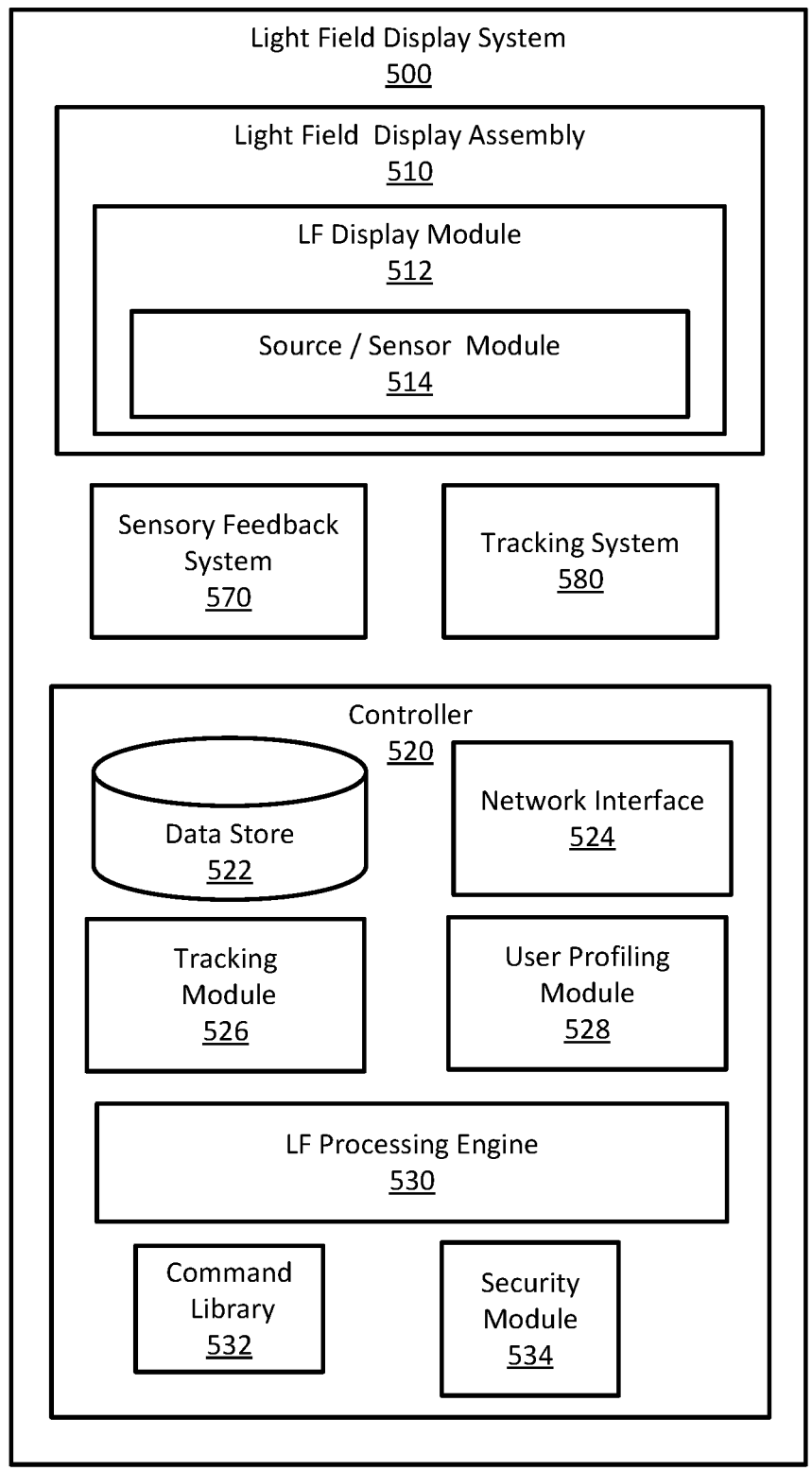
FIG. 5 is a block diagram of a light field display system, in accordance with one or more embodiments.

FIG. 5 is a block diagram of a LF display system 500, in accordance with one or more embodiments. The LF display system 500 comprises a LF display assembly 510 and a controller 520. The LF display assembly 510 includes one or more LF display modules 512 which project a light field. A LF display module 512 may include a source/sensor system 514 that includes an integrated energy source(s) and/or energy sensor(s) which project and/or sense other types of energy. The controller 520 includes a data store 522, a network interface 524, a LF processing engine 530, a command library 532, and a security module 534. The controller 520 may also include a tracking module 526, and a user profiling module 528. In some embodiments, the LF display system 500 also includes a sensory feedback system 570 and a tracking system 580. The LF display systems described in the context of FIGS. 1, 2, 3, and 4 are embodiments of the LF display system 500. In other embodiments, the LF display system 500 comprises additional or fewer modules than those described herein. Similarly, the functions can be distributed among the modules and/or different entities in a different manner than is described here. Applications of the LF display system 500 are also discussed in detail below with regard to FIGS. 6-7.

The LF display assembly 510 provides holographic content in a holographic object volume that may be visible to viewers located within a viewing volume. The LF display assembly 510 may provide holographic content by executing display instructions received from the controller 520. The holographic content may include one or more holographic objects that are projected in front of an aggregate surface of the LF display assembly 510, behind the aggregate surface of the LF display assembly 510, or some combination thereof. Generating display instructions with the controller 520 is described in more detail below.

The LF display assembly 510 provides holographic content using one or more LF display modules (e.g., any of the LF display module 110, the LF display system 200, and LF display module 300) included in an LF display assembly 510. For convenience, the one or more LF display modules may be described herein as LF display module 512. The LF display module 512 can be tiled to form a LF display assembly 510. The LF display modules 512 may be structured as various seamless surface environments (e.g., single sided, multi-sided, a curved surface, etc.). That is, the tiled LF display modules form an aggregate surface. As previously described, a LF display module 512 includes an energy device layer (e.g., energy device layer 220) and an energy waveguide layer (e.g., energy waveguide layer 240) that present holographic content. The LF display module 512 may also include an energy relay layer (e.g., energy relay layer 230) that transfers energy between the energy device layer and the energy waveguide layer when presenting holographic content.

The LF display module 512 may also include other integrated systems configured for energy projection and/or energy sensing as previously described. For example, a light field display module 512 may include any number of energy devices (e.g., energy device 340) configured to project and/or sense energy. For convenience, the integrated energy projection systems and integrated energy sensing systems of the LF display module 512 may be described herein, in aggregate, as the source/sensor system 514. The source/sensor system 514 is integrated within the LF display module 512, such that the source/sensor system 514 shares the same seamless energy surface with LF display module 512. In other words, the aggregate surface of an LF display assembly 510 includes the functionality of both the LF display module 512 and the source/sensor module 514. That is, an LF assembly 510 including a LF display module 512 with a source/sensor system 514 may project energy and/or sense energy while simultaneously projecting a light field. For example, the LF display assembly 510 may include a LF display module 512 and source/sensor system 514 configured as a dual-energy surface or bidirectional energy surface as previously described.

In some embodiments, the LF display system 500 augments the generated holographic content with other sensory content (e.g., coordinated touch, audio, pressure, force, or olfactory) using a sensory feedback system 570. The sensory feedback system 570 may augment the projection of holographic content by executing display instructions received from the controller 520. Generally, the sensory feedback system 570 includes any number of sensory feedback devices external to the LF display assembly 510 (e.g., sensory feedback system 442). Some example sensory feedback devices may include coordinated acoustic projecting and receiving devices, aroma projecting devices, temperature adjustment devices, force actuation devices, pressure sensors, accelerometers, gyroscopes, transducers, etc. In some cases, the sensory feedback system 570 may have similar functionality to the light field display assembly 510 and vice versa. For example, both a sensory feedback system 570 and a light field display assembly 510 may be configured to generate a sound field. As another example, the sensory feedback system 570 may be configured to generate haptic surfaces while the light field display 510 assembly is not.

To illustrate, in an example embodiment of a light field display system 500, a sensory feedback system 570 may include acoustic projection devices. The acoustic projection devices are configured to generate one or more pressure waves that complement the holographic content when executing display instructions received from the controller 520. The generated pressure waves may be, e.g., audible (for sound), ultrasonic (for touch), or some combination thereof. Similarly, the sensory feedback system 570 may include an aroma projecting device. The aroma projecting device may be configured to provide scents to some, or all, of the target area when executing display instructions received from the controller. Further, the sensory feedback system 570 may include a temperature adjustment device. The temperature adjustment device is configured to increase or decrease temperature in some, or all, of the target area when executing display instructions received from the controller 520.

In some embodiments, the sensory feedback system 570 may include a force actuating device. The force actuating device may be used to move some physical objects in the target area. In one example, the LF display system 500 may be integrated with a multi-sensory game application, wherein a force actuation device may move pieces associated with the game.

In some embodiments, the sensory feedback system 570 is configured to receive input from viewers of the LF display system 500. In this case, the sensory feedback system 570 includes various sensory feedback devices for receiving input from viewers. The sensory feedback devices may include devices such as acoustic receiving devices (e.g. a microphone), pressure sensors, motion detectors, ultrasonic transducers, other transducers, force sensors, temperature sensors, touch sensors, proximity sensors, etc. The sensor feedback system may also be comprised of buttons, dials, knobs, keypads, finger print sensors, joysticks, other input hardware, or any combination thereof. The sensory feedback system 570 may include sensory feedback devices that are configured to provide sensory feedback as holographic content is presented. The sensory feedback system may transmit the detected input to the controller 520 to coordinate generating holographic content and/or sensory feedback. In some embodiments, the sensory feedback system 570 identifies received input from the viewers as a received command to the mobile device from the viewer.

To illustrate, in an example embodiment of a light field display assembly, a sensory feedback system 570 includes a microphone. The microphone is configured to record audio produced by a mobile device user. The sensory feedback system 570 provides the recorded audio to the controller 520 as user input. The controller 520 may use the user input to generate holographic content. Similarly, the sensory feedback system 570 may include a pressure sensor. The pressure sensor is configured to measure a force applied by a user to the pressure sensor. The sensory feedback system 570 may provide the measured forces to the controller 520 as user input.

In some embodiments, the sensory feedback assembly 570 is configured also to redirect user movement. In one embodiment, the sensory feedback assembly 570 includes an acoustic projection device which can create a tactile pressure wave to discourage movement, such as, for example, when the tracking system 580 tracks the presence of a user hand blocking the mobile device cameras while the camera sensors are actively recording image data. In another embodiment, the sensory feedback assembly 570 may use an acoustic emitting device to audibly signal the user from further action (e.g., "Camera is recording-do not block the camera").

In some embodiments, the LF display system 500 includes a tracking system 580. The tracking system 580 includes any number of tracking devices configured to obtain information about a user of the device, the information including position, movement, gesture, expression, gaze, and/or characteristics such as gender and age of users in the target area. Generally, the tracking devices are external to the LF display assembly 510. Some example tracking devices include a camera assembly ("camera"), a depth sensor, structured light, a LIDAR system, a card scanning system, or any other tracking device that can track users within a target area.

The tracking system 580 may include one or more energy sources that illuminate some or all of the target area with light. However, in some cases, the target area is illuminated with natural light and/or ambient light from the LF display assembly 510 when presenting holographic content. The energy source projects light when executing instructions received from the controller 520. The light may be, e.g., a structured light pattern, a pulse of light (e.g., an IR flash), or some combination thereof. The tracking system may project light in the visible band (~380 nm to 750 nm), in the infrared (IR) band (~750 nm to 1700 nm), in the ultraviolet band (10 nm to 380 nm), some other portion of the electromagnetic spectrum, or some combination thereof. A source may include, e.g., a light emitted diode (LED), a micro LED, a laser diode, a TOF depth sensor, a tunable laser, etc.

The tracking system 580 may adjust one or more emission parameters when executing instructions received from the controller 520. An emission parameter is a parameter that affects how light is projected from a source of the tracking system 580. An emission parameter may include, e.g., brightness, pulse rate (to include continuous illumination), wavelength, pulse length, some other parameter that affects how light is projected from the source assembly, or some combination thereof. In one embodiment, a source projects pulses of light in a time-of-flight operation.

The camera of the tracking system 580 captures images of the light (e.g., structured light pattern) reflected from the target area. The camera captures images when executing tracking instructions received from the controller 520. As previously described, the light may be projected by a source of the tracking system 580. The camera may include one or more cameras. That is, a camera may be, e.g., an array (1D or 2D) of photodiodes, a CCD sensor, a CMOS sensor, some other device that detects some or all of the light project by the tracking system 580, or some combination thereof. In an embodiment, the tracking system 580 may contain a light field camera external to the LF display assembly 510. In other embodiments, the cameras are included as part of the LF display module included in the LF display assembly 510. For example, as previously described, if the energy relay element of a light field module 512 is a bidirectional energy layer which interleaves both emissive displays and imaging sensors at the energy device layer 220, the LF display assembly 510 can be configured to simultaneously project light fields and record imaging information from the viewing area in front of the display. In one embodiment, the captured images from the bidirectional energy surface form a light field camera. The camera provides captured images to the controller 520.

The camera of the tracking system 580 may adjust one or more imaging parameters when executing tracking instructions received from the controller 520. An imaging parameter is a parameter that affects how the camera assembly captures images. An imaging parameter may include, e.g., frame rate, aperture, gain, exposure length, frame timing, some other parameter that affects how the camera assembly captures images, or some combination thereof.

In some embodiments, the tracking system 580 is configured also to receive input from viewers of the LF display system 500. The tracking system 580 may track a viewer's body movement and send information regarding a particular tracked movement to the controller 520. In some embodiments, the tracking system 580 is used in concert with a holographic user interface presented to the user.

The controller 520 controls the LF display assembly 510 and any other components of the LF display system 500. The controller 520 comprises a data store 522, a network interface 524, a tracking module 526, a user profiling module 528, a light field processing engine 530, and a command library 532. In other embodiments, the controller 520 comprises additional or fewer modules than those described herein. Similarly, the functions can be distributed among the modules and/or different entities in a different manner than is described here. For example, the tracking module 526 may be part of the LF display assembly 510 or the tracking system 580.

The data store 522 is a memory that stores information for the LF display system 500. The stored information may include display instructions, tracking instructions, emission parameters, imaging parameters, virtual models of target areas, tracking information, images captured by the camera, one or more user profiles, calibration data for the light field display assembly 510, configuration data for the LF display system 510 including resolution and orientation of LF modules 512, desired viewing volume geometry, content for graphics creation including 3D models, scenes and environments, materials and textures, security related information including authentication factors such as passwords, smart cards, biometric data that may be used by the security module 534, other information that may be used by the LF display system 500, or some combination thereof.

The data store 522 is a memory, such as a read only memory (ROM), dynamic random access memory (DRAM), static random access memory (SRAM), or some combination thereof.

The network interface 524 allows the light field display system to communicate with other systems or environments via a network. In one example, the LF display system 500 receives holographic content from a remote server such as an online holographic content store via the network interface 524. In another example, the LF display system 500 transmits holographic content to a remote data store using the network interface 524.

The tracking module 526 tracks viewers viewing content presented by the LF display system 500. To do so, the tracking module 526 generates tracking instructions that control operation of the source(s) and/or the camera(s) of the tracking system 580, and provides the tracking instructions to the tracking system 580. The tracking system 580 executes the tracking instructions and provides tracking input to the tracking module 526.

The tracking module 526 may determine a position of one or more viewers within a target area of the mobile device. The determined position may be relative to some reference point (e.g., a display surface). In other embodiments, the determined position may be within the virtual model of the target area. The tracked position may be, e.g., the tracked position of a viewer and/or a tracked position of a portion of a viewer (e.g., eye location, hand location, etc.). The tracking module 526 determines the position using one or more captured images from the cameras of the tracking system 580. The cameras of the tracking system 580 may be distributed about the LF display system 500, and can capture images in stereo, allowing for the tracking module 526 to passively track users. In other embodiments, the tracking module 526 actively tracks users. That is, the tracking system 580 illuminates some portion of the target area, images the target area, and the tracking module 526 uses time of flight and/or structured light depth determination techniques to determine position. The tracking module 526 generates tracking information using the determined positions.

The tracking module 526 may also receive tracking information as inputs from viewers of the LF display system 500, such as for example while using a holographic user-interface on the mobile device (further described below). The tracking information may include body movements that correspond to various input options that the user is provided by the LF display system 500. For example, the tracking module 526 may track a user's body movement and assign any of various movements as an input to the LF processing engine 530. The tracking module 526 may provide the tracking information to the data store 522, the LF processing engine 530, the user profiling module 528, the command store 532, any other component of the LF display system 500, or some combination thereof. The LF processing engine 530 may generate holographic content based in part on the provided tracking information.

To provide context for the tracking module 526, consider an example embodiment of an LF display system 500 used in a gaming application within the mobile device. When the user responds to a win by pumping their first in the air to show their excitement, the tracking system 580 may record the movement of the user's hands and transmit the recording to the tracking module 526. The tracking module 526 tracks the motion of the user's hands in the recording and sends the input to LF processing engine 530, described below. The user profiling module 528, as described below, determines that information in the image indicates that motion of the user's hands is associated with a positive response. Accordingly, the LF processing engine 530 generates appropriate holographic content to celebrate the win. For example, the LF processing engine 530 may project confetti in the holographic object volume in association with the gaming application.

The LF display system 500 includes a user profiling module 528 configured to identify and profile device users. The user profiling module 528 generates a profile of a user (or users) that views holographic content displayed by a LF display system 500. The user profiling module 528 generates a user profile based, in part, on user input and monitored user behavior, actions, and reactions. The user profiling module 528 can access information obtained from tracking system 580 (e.g., recorded images, videos, sound, etc.) and process that information to determine various information. In various examples, user profiling module 528 can use machine vision or machine learning algorithms to determine user behavior, actions, and reactions. Monitored user behavior can include, for example, smiles, cheering, clapping, laughing, fright, screams, excitement levels, recoiling, other changes in gestures, or movement by the users, etc.

More generally, a user profile may include any information received and/or determined about a user viewing holographic content from the LF display system. For example, each user profile may log actions or responses of that user to the content displayed by the LF display system 500. Some example information that can be included in a user profile are provided below.

A user profile may be based on behavior of a user with respect to content displayed by the LF display system 500. In some embodiments, software applications residing in the device may be functionally integrated with the LF display system 500, and the user profile is based on user behavior that are monitored while executing these software applications in the device.

Thus, for example, monitored behavior may include features such as number of times a user uses an application in a period of time such as a day or a week, how often a user uses a particular setting on an application (e.g., how often is a "Level 8" setting used with a particular puzzle game application in the device), how the user responds to certain types of holographic content (e.g., in a clock alarm application-what is a preferred setting for a user-a holographic image of a flashing button accompanied with a high frequency whistle or a holographic image of just a flashing button), some other behavior relating to the use of the particular device, or some combination thereof.

In another example, the user may exhibit preferences for haptic interfaces that are presented in conjunction with holographic content, for example preferred key click sensitivities in a holographic keyboard touch interface that may be generated by the LF display system 100 and offered as an option to the mobile device user.

Other user characteristics stored as part of user profile information may include, e.g., name of a user, age of a user, ethnicity, gender, viewing location, work information, education, income, money spent on purchases, hobbies, location, viewing history, categories of viewed online items, purchase history, device and application setting preferences, place of residence, any other demographic information, or some combination thereof.

The user profiling module 528 may also access a profile associated with a particular user (or users) from a third-party system or online systems to build and/or update a user profile. The user profiling module 528 may be configured to update the user profile using information from a social media account of the user (or users). For example, user interactions with third-party vendors that are linked to that user's social media or other online accounts may provide further user profile information that may be accessed by the user profiling module 528. Thus, the user profile information could store information such as favorite musicians, favorite movie characters, disliked music genres, etc., and leverage this information in accessing content from an online holographic content store.

In some embodiments, the data store 522 includes a user profile store that stores user profiles generated, updated, and/or maintained by the user profiling module 528. The user profile can be updated in the data store at any time by the user profiling module 528. For example, in an embodiment, the user profile store receives and stores information regarding a particular user in their user profile when the particular user views holographic content provided by the LF display system 500. In this example, the user profiling module 528 includes a facial recognition algorithm that may recognize users and positively identify as they view presented holographic content. To illustrate, as a user enters the target area of the LF display system 500, the tracking system 580 obtains an image of the user. The user profiling module 528 inputs the captured image and identifies the user's face using the facial recognition algorithm. The identified face is associated with a user profile in the profile store and, as such, all input information obtained about that user may be stored in their profile. The user profiling module may also utilize card identification scanners, voice identifiers, a radio-frequency identification (RFID) chip scanners, barcode scanners, etc. to positively identify a user.

Because the user profiling module 528 can positively identify users, the user profiling module 528 can determine each user of the LF display system 500, as well as information about each user. This is particularly relevant when a mobile device may be shared by multiple users—such as for example, mobile tablet devices with shared usage by multiple students in a classroom setting, or within a family. The user profiling module 528 may then store the time and date of each visit in the user profile for each user. Similarly, the user profiling module 528 may store received inputs from a user from any combination of the sensory feedback system 570, the tracking system 580, and/or the LF display assembly 510 each time they occur. The user profile system 528 may additionally receive further information about a user from other modules or components of the controller 520 which can then be stored with the user profile. Other components of the controller 520 may then also access the stored user profiles for determining subsequent content to be provided to that user. The controller 520 may be configured to receive or generate holographic content based at least in part accessed data from the stored user profiles. For example, the user interface generated for the teenager in the family might use an avatar of her favorite holographic comic book super heroine to receive verbal commands, while the user interface generated for the grandfather might be an enlarged flashing holographic interface with easily visible large renderings of buttons with coincident tactile stimuli for ease of "pushing."

The LF processing engine 530 generates 4D coordinates in a rasterized format ("rasterized data") that, when executed by the LF display assembly 510, cause the LF display assembly 510 to present holographic content. The LF processing engine 530 may access the rasterized data from the data store 522. Additionally, the LF processing engine 530 may construct rasterized data from a vectorized data set. Vectorized data is described below. The LF processing engine 530 can also generate sensory instructions required to provide sensory content that augments the holographic objects. As described above, sensory instructions may generate, when executed by the LF display system 500, haptic surfaces, sound fields, and other forms of sensory energy supported by the LF display system 500. The LF processing engine 530 may access sensory instructions from the data store 522, or construct the sensory instructions form a vectorized data set. In aggregate, the 4D coordinates and sensory data represent display instructions executable by a LF display system to generate holographic and sensory content.

The amount of rasterized data describing the flow of energy through the various energy sources in a LF display system 500 is incredibly large. While it is possible to display the rasterized data on a LF display system 500 when accessed from a data store 522, it is untenable to efficiently transmit, receive (e.g., via a network interface 524), and subsequently display the rasterized data on a LF display system 500. Take, for example, rasterized data representing a short video for holographic projection by a LF display system 500. In this example, the LF display system 500 includes a display containing several gigapixels and the rasterized data contains information for each pixel location on the display. The corresponding size of the rasterized data is vast (e.g., many gigabytes per second of video display time), and unmanageable for efficient transfer over commercial networks via a network interface 524. The efficient transfer problem may be amplified for applications including live streaming of holographic content. An additional problem with merely storing rasterized data on data store 522 arises when an interactive experience is desired using inputs from the sensory feedback system 570 or the tracking module 526. To enable an interactive experience, the light field content generated by the LF processing engine 530 can be modified in real-time in response to sensory or tracking inputs. In other words, in some cases, LF content cannot simply be read from the data store 522.

Therefore, in some configurations, data representing holographic content for display by a LF display system 500 may be transferred to the LF processing engine 530 in a vectorized data format ("vectorized data"). Vectorized data may be orders of magnitude smaller than rasterized data. Further, vectorized data provides high image quality while having a data set size that enables efficient sharing of the data. For example, vectorized data may be a sparse data set derived from a denser data set. Thus, vectorized data may have an adjustable balance between image quality and data transmission size based on how sparse vectorized data is sampled from dense rasterized data. Tunable sampling to generate vectorized data enables optimization of image quality for a given network speed. Consequently, vectorized data enables efficient transmission of holographic content via a network interface 524. Vectorized data also enables holographic content to be live-streamed over a commercial network.

In summary, the LF processing engine 530 may generate holographic content derived from rasterized data accessed from the data store 522, vectorized data accessed from the data store 522, or vectorized data received via the network interface 524. In various configurations, vectorized data may be encoded before data transmission and decoded after reception by the LF controller 520. In some examples, the vectorized data is encoded for added data security and performance improvements related to data compression. For example, vectorized data received by the network interface may be encoded vectorized data received from a holographic streaming application. In some examples, vectorized data may require a decoder, the LF processing engine 530, or both of these to access information content encoded in vectorized data. The encoder and/or decoder systems may be available to customers or licensed to third-party vendors.

Vectorized data contains all the information for each of the sensory domains supported by a LF display system 500 in way that supports an interactive experience. For example, vectorized data for an interactive holographic experience includes any vectorized properties that can provide accurate physics for each of the sensory domains supported by a LF display system 500. Vectorized properties may include any properties that can be synthetically programmed, captured, computationally assessed, etc. A LF processing engine 530 may be configured to translate vectorized properties in vectorized data to rasterized data. The LF processing engine 530 may then project holographic content translated from the vectorized data from a LF display assembly 510. In various configurations, the vectorized properties may include one or more red/green/blue/alpha channel (RGBA)+ depth images, multi view images with or without depth information at varying resolutions that may include one high-resolution center image and other views at a lower resolution, material properties such as albedo and reflectance, surface normals, other optical effects, surface identification, geometrical object coordinates, virtual camera coordinates, display plane locations, lighting coordinates, tactile stiffness for surfaces, tactile ductility, tactile strength, amplitude and coordinates of sound fields, environmental conditions, somatosensory energy vectors related to the mechanoreceptors for textures or temperature, audio, and any other sensory domain property. Many other vectorized properties are also possible.

The LF display system 500 can also generate an interactive viewing experience. That is, holographic content may be responsive to input stimuli containing information about user locations, gestures, interactions, interactions with holographic content, or other information derived from the user profiling module 528, and/or tracking module 526. For example, in an embodiment, a LF processing system 500 creates an interactive viewing experience using vectorized data of a real-time performance received as part of a live-streaming application on the device via a network interface 524. In another example, if a holographic object needs to move in a certain direction immediately in response to a user interaction, the LF processing engine 530 may update the render of the scene so the holographic object moves in that required direction. This may require the LF processing engine 530 to use a vectorized data set to render light fields in real time based on a 3D graphical scene with the proper object placement and movement, collision detection, occlusion, color, shading, lighting, etc., correctly responding to the user interaction. The LF processing engine 530 converts the vectorized data into rasterized data for presentation by the LF display assembly 510.

The rasterized data includes holographic content instructions and sensory instructions (display instructions) representing the real-time performance. The LF display assembly 510 simultaneously projects holographic and sensory content of the real-time performance by executing the display instructions. The LF display system 500 monitors user interactions (e.g., vocal response, touching, etc.) with the presented real-time performance with the tracking module 526 and user profiling module 528. In response to the user interactions, the LF processing engine creates an interactive experience by generating additional holographic and/or sensory content for display to the users.

To illustrate, consider an example embodiment of an LF display system 500 including a LF processing engine 530 that generates, during the execution of an application in a mobile device, a plurality of holographic objects representing balloons floating in the viewing volume of the user of the mobile device. A user may move to touch the holographic object representing the balloon. Correspondingly, the tracking system 580 tracks movement of the user's hands relative to the holographic object. The movement of the user is recorded by the tracking system 580 and sent to the controller 520. The tracking module 526 continuously determines the motion of the user's hand and sends the determined motions to the LF processing engine 530. The LF processing engine 530 determines the placement of the user's hand in the scene, adjusts the real-time rendering of the graphics to include any required change in the holographic object (such as position, color, or occlusion). The LF processing engine 530 instructs the LF display assembly 510 (and/or sensory feedback system 570) to generate a tactile surface using the volumetric haptic projection system (e.g., using ultrasonic speakers). The generated tactile surface corresponds to at least a portion of the holographic object and occupies substantially the same space as some or all of an exterior surface of the holographic object. The LF processing engine 530 uses the tracking information to dynamically instruct the LF display assembly 510 to move the location of the tactile surface along with a location of the rendered holographic object such that the user is given both a visual and tactile perception of touching the balloon. More simply, when a user views his hand touching a holographic balloon, the user simultaneously feels haptic feedback indicating their hand touches the holographic balloon, and the balloon changes position or motion in response to the touch. In some examples, rather than presenting an interactive balloon in association executing an application with content accessed from a data store 522, the interactive balloon may be received as part of holographic content received from a live-streaming application via a network interface 524.

The LF processing engine 530 may provide holographic content for concurrent display to viewers of media content on a portable mobile device. For example, a video being viewed on a mobile device that is augmented with a LF display system 500 may include holographic content to be presented to the user during the video ("holographic content track"). The holographic content track may be received by the device and stored in the data store 522. The holographic content track includes holographic content that enhances the viewing experience of a user viewing the video on the device.

The LF processing engine 530 may create, modify and/or update holographic content based on a user profile. Updates to a user profile may result in updates to the displayed holographic content. In some embodiments, the LF processing engine 530 may create, modify and/or update the holographic content based on the user profile in conjunction with an artificial intelligence model.

The holographic content in a holographic content track may be associated with any number of temporal, auditory, visual, etc. cues to display the holographic content. For example, the holographic content track can include holographic content to be displayed at a specific time during a video. As an illustration, the holographic content track may include a pod of holographic dolphins to display during the video "Bottlenosed" 35 minutes and 42 seconds after the video begins. In another example, a holographic content track includes holographic content to be presented when sensory feedback system 570 records a specific audio cue. As an illustration, a holographic content track includes a holographic avatar laughing to present during a gaming application when audio recorded by sensory feedback system 570 indicates that the user/player is laughing. In another example, a holographic content track includes holographic content to display when the tracking system 580 records a specific visual cue. As an illustration, a holographic content track includes a holographic flashing sign with the words "Do you want to stop?" on display when a tracking system 580 records information indicates that a user is moving away from the device. Determining auditory and visual cues is described in more detail below.

The holographic content track may also include spatial rendering information. That is, the holographic content track may indicate the spatial location for presenting holographic content in displayed video track. For example, the holographic content tract may indicate that certain holographic content is to be presented in some holographic viewing volumes while not others. To illustrate, LF processing engine 530 may present a holographic screen displaying an email application in a holographic viewing volume directly in front of the user's face. Similarly, the holographic content track may indicate holographic content to present to some viewing volumes while not others. For example, the LF processing engine may present the holographic screen to a viewing volume directly in front of the user's face but not in any other viewing volume so that the screen is private to the user only.

The LF processing engine 530 may provide holographic content to display to the user in conjunction with an application executing on the device. The holographic content may be received at the LF display system 500 device over a network from an online holographic content store that makes available holographic content for downloading to mobile devices in exchange for a transaction fee. For example, the user may access an online holographic content store, and obtain a particular super hero character in exchange for a transaction fee for use as a holographic avatar in conjunction with applications executing on the device. The holographic content may be received at the LF display system 500 over a network from an online holographic application store that makes available holographic applications for downloading and execution on the mobile device in exchange for a transaction fee. For example, the user may access a holographic application store for buying an application for generating and customizing a holographic avatar, and the application executable may download a specialized holographic user-interface for generating and customizing a holographic avatar. The holographic content may be provided as part of advertising content in association with specific applications executing on the device. For example, when the user clicks on a gaming application on the mobile device, the LF display system 500 may access holographic content of products as advertisements provided by an advertiser and display these during the course of the gaming application. The holographic content may be stored in the data store 522, or streamed to the LF display system 500 in vectorized format through the network interface 524.

The LF processing engine 500 may also modify holographic content to suit environmental characteristics at a location. For example, based on whether the user is located in a dark room space, in a brightly lit room, in a sunny outside location, etc., the LF processing engine may modify the holographic content on a mobile device to be displayed with brightness that is appropriate to the lighting of the location. The LF processing engine may use data stored in the data store 522 along with information from a camera system in the tracking module 580 to customize the display of the holographic content. Furthermore, the modification of the holographic content may also take user display preferences as determined by the user profiling module 528.

The LF processing engine 530 may also modify holographic content in response to information received from the sensory feedback system 570. For example, an accelerometer in the sensory feedback system 570 may measure linear acceleration of the mobile device. The LF processing engine 530 may modify the displayed holographic content to filter out any visual jitter in the holographic display caused by acceleration. Similarly, a gyroscope in the sensory feedback system 570 may detect a change in the orientation of the mobile device and may reorient displayed holographic content based on the detected change. In some embodiments, the tracking module 526 may track a user's head rotation and may reorient the displayed holographic UI in response to this.

The LF processing engine 530 may also create holographic content for display by the LF display system 500. Importantly, here, creating holographic content for display is different from accessing, or receiving, holographic content for display. That is, when creating content, the LF processing engine 530 generates entirely new content for display rather than accessing previously generated and/or received content. The LF processing engine 530 may obtain or receive information from the data store 522, the tracking module 526, the user profiling module 528, the sensory feedback system 570, the tracking system 580, or some combination thereof, to create holographic content for display. In some examples, LF processing engine 530 may access information from elements of the LF display system 500 (e.g., tracking information and/or a user profile), create holographic content based on that information, and display the created holographic content using the LF display system 500. The created holographic content may be augmented with other sensory content (e.g., touch, audio, pressure, force, or smell/olfactory) when displayed by the LF display system 500. Further, the LF display system 500 may store created holographic content in the data store 522 for future use.

In some embodiments, the LF processing engine 530 may cause the generated holographic content to be updated, modified, deleted, paused, or a combination thereof in response to changing an operating state of the mobile device. In some embodiments, the LF processing engine 530 may cause the generated holographic display to be updated, modified, deleted, paused, or some combination thereof in response to information that is received from by the tracking system 580 and interpreted by the tracking module 526. For example, the tracking module 580 may provide user gaze information captured from the tracking system 580 to the LF display module for re-rendering a holographic character so that the holographic character makes eye-contact with the user who is interacting with the device. In some embodiments, the operational choices made by the user may affect the display of the holographic content. For example, when the LF display system determines that the user has made an operational choice having an alarm application produce an alert at 6:00 am, the LF display system may present a holographic depiction of a flashing red button along with the alert sound only at 6:00 am, or as configured by the user.

In some embodiments, the LF display system 500 includes a command library 532. The command library 532 may act as a command interface that recognizes and interprets user commands. The recognized commands may cause a change in the operating state of the mobile device. The user commands may be interpreted based on tracking information received from the sensory feedback system 570 (e.g., audio), the tracking module 526 (e.g., tracked gestures or expressions), the user profiling module 528 (e.g., stored individual preferences), or some combination thereof. The command library 532 may apply heuristics to interpret the user commands, and direct the LF processing engine 530 to generate the appropriate holographic content, tactile, and any other multisensory information. The command library 532 stores mappings of received user commands to computational commands that can be executed by the LF display system 500. The command library 532 also stores heuristics associated with the stored mappings. The command library 532 may receive user commands through a holographic user interface that is displayed by the LF display system 500. Examples of possible user commands received through the mobile device by the LF display system 500 may include varied touch contact of a holographic object by the user (for example, a finger touch of a particular displayed holographic "button") and varied touch movement against the surface of a holographic object (for example, turning a displayed holographic "knob"). In some embodiments, a touch contact or a touch movement may be determined to have occurred when the user is determined by the tracking module 526 to be within a threshold distance of a displayed holographic object that is projected as a portion of a holographic user interface. In some embodiments, user commands may include sensory feedback provided by the user such as verbal commands spoken by the user while within the target area (for example, a spoken command of the form "show me the location of the next gas station" that is captured using an acoustic receiver on the mobile device), gestures and body movements captured by the tracking system 580 (for example, a hand held up by a user in a target area to indicate that the timer should pause), sensing a physical switch, knob, button, or dial connected to the display as part of the sensory feedback system 570, etc. or a combination thereof.

The computational commands to be executed by the LF processing engine corresponding to the received user commands may include commands to display particular holographic objects, update the display of holographic content, modify the display of a particular holographic object, display a sequence of holographic objects, pause or play content being presented by the LF display system 500, delete a displayed object, or a combination thereof. Other computational commands may involve actuating other sensors and controls, such as, for example, gaming controls of a joy stick. Thus, in some embodiments, a detected user action, for example, turning a displayed holographic "dial," is reported by the tracking system 580 to the command library 532. In response, the command library 532 may apply a heuristic from the stored heuristics and determine that a computational command needs to be executed involving sending instructions to the system to, for example, set the timer application in a displayed holographic clock appropriately.

In some embodiments, the command library 540 receives information from the data store 522 and the tracking module 580 to resolve ambiguous mappings based on user commands that may be detected with less confidence. However, information from the tracking system 580 and the user profile information from the data store 522, may provide sufficient heuristic information to disambiguate the mappings and determine the specific computational command to be executed. This determined computational command is then provided to the LF processing engine 530 for execution.

In some embodiments, the LF display system 500 includes a security module 534. The security module 534 enforces secure access to at least some of the functionalities provided by the LF display system. To do so, the security module 534 may generate user interface elements by the LF display system 500 for receiving authentication credential information such as passwords or biometric data from a user of the mobile device. The security module may authenticate the credential information based on data stored in the data store 522. Subsequent to authenticating the user, the security module 534 may enable secure access by the user to some or all of the functionalities of the LF display system 500. In some embodiments, the security module 534 may enable the display of particular holographic content that is accessed from the data store or from online sources, or the execution of certain applications on the mobile device. For example, the LF display system may present certain holographic content to the viewer only upon authenticating user credentials, and not present them in the absence of authenticated user credentials. The security module 534 may provide information related to authenticating a user of the mobile device to the data store 522, the user profiling module 528, the LF processing engine 530, the command library 532, any other component of the LF display system 500, or some combination thereof.

Dynamic Content Generation for a LF Display System

In some embodiments, the LF processing engine 530 incorporates an artificial intelligence (AI) model to create holographic content for display by the LF display system 500. The AI model may include supervised or unsupervised learning algorithms including but not limited to regression models, neural networks, classifiers, or any other AI algorithm. The AI model may be used to determine user preferences based on user information recorded by the LF display system 500 (e.g., by tracking system 580) which may include information on a user's behavior. The AI model may also store the learned preferences of each user in the user profile store of the data store 522. In some examples, when multiple users may operate the mobile device, the AI model may create holographic content for the particular individual user based on the learned preferences of that user. The AI model may access information from the data store 522 to create and/or modify the holographic content. In some embodiments, the AI model may use results of the learning algorithms to establish user-specific heuristics for the command mappings stored in the command library 532.

One example of an AI model that can be used to identify characteristics of users, identify reactions, and/or generate holographic content based on the identified information is a convolutional neural network model with layers of nodes, in which values at nodes of a current layer are a transformation of values at nodes of a previous layer. A transformation in the model is determined through a set of weights and parameters connecting the current layer and the previous layer. In some examples, the transformation can also be determined through a set of weights and parameters used to transform between previous layers in the model.

The input to the model may be an image taken by tracking system 580 encoded onto the first convolutional layer and the output of the model is holographic content decoded from the output layer of the neural network. Alternatively or additionally, the output may be a determined characteristic of a user in the image. In this example, the AI model may identify latent information in the image representing user characteristics in one of the intermediate layers of the neural network. Relevance information between elements identified in the layers can be retrieved by applying a set of transformations between the corresponding intermediate layers. The weights and parameters for the transformations may indicate relationships between information contained in the starting layer and the information obtained from the final output layer. For example, the weights and parameters can be a quantization of shapes, colors, sizes, etc. included in information representing a smiling user in an image. The weights and parameters may be based on historical data (e.g., previously tracked users). In some embodiments, the information from the tracking system may be used in conjunction with an AI model to generate a volumetric tactile surface that is either coincident with or within a threshold distance of presented holographic content.

In one embodiment, the AI model includes deterministic methods that have been trained with reinforcement learning (thereby creating a reinforcement learning model). The model is trained to increase the quality of the performance using measurements from tracking system 580 as inputs, and changes to the created holographic content as outputs.

Reinforcement learning is a machine learning system in which a machine learns 'what to do'—how to map situations to actions—so as to maximize a numerical reward signal. The learner (e.g. LF processing engine 530) is not told what actions to take (e.g., generating prescribed holographic content), but instead discovers which actions yield the most reward (e.g., increasing the quality of holographic content by making the user smile more) by trying them. In some cases, actions may affect not only the immediate reward but also the next situation and, through that, all subsequent rewards. These two characteristics—trial-and-error search and delayed reward—are two distinguishing features of reinforcement learning.

The AI model can include any number of machine learning algorithms. Some other AI models that can be employed are linear and/or logistic regression, classification and regression trees, k-means clustering, vector quantization, etc. In general, the LF processing engine 530 takes an input from the tracking module 526 and/or user profiling module 528 and a machine learning model creates holographic content in response. Similarly, the AI model may direct the rendering of holographic content.

Network Environment

Figure 6:
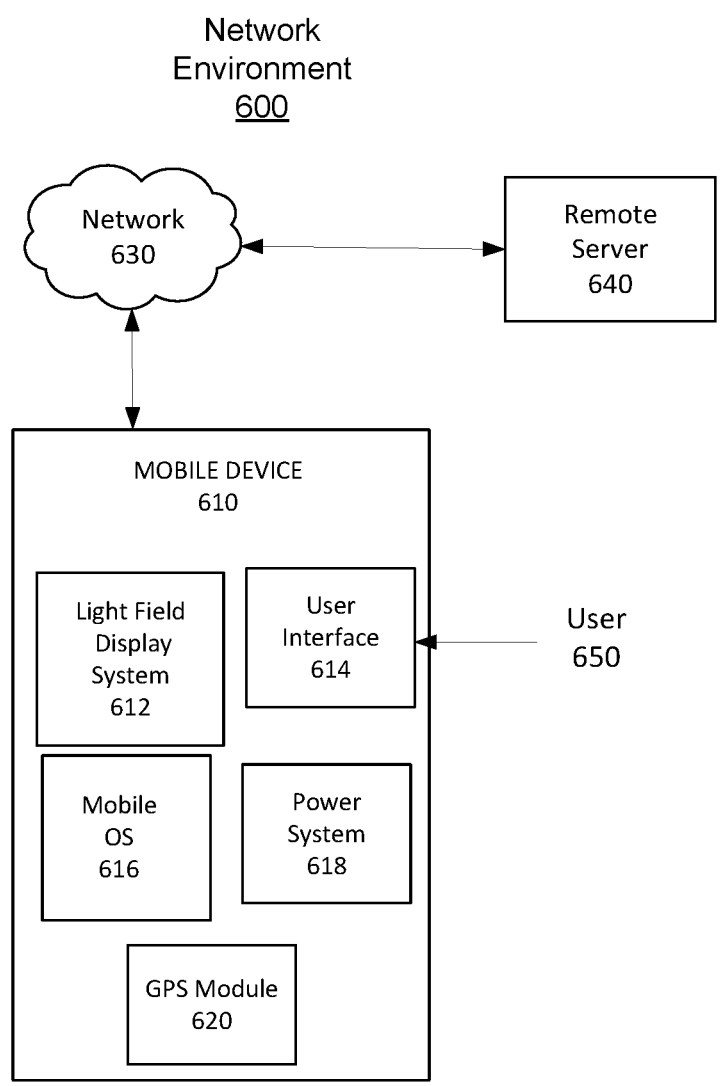
FIG. 6 is a block diagram of a network environment for a light field display system in a mobile device, in accordance with one or more embodiments.

FIG. 6 depicts a block diagram of a network environment 600, in accordance with one or more embodiments. The network environment 600 comprises one or more mobile devices 610, a network 630, and one or more remote servers 640.

In one embodiment, the mobile device 610 is a portable computing device that executes computer program modules, for example, a web browser or client applications, which allow a user to browse the Internet, consume media content, and execute a variety of software applications. The mobile device 610 may be, for example, a personal computer, a tablet computer, a smart phone, a dedicated e-reader, or any other type of portable network-capable device. The mobile device 610 comprises a light field display system 612, and a user interface 614. In other embodiments, the mobile device 610 comprises additional or fewer modules than those described herein. Similarly, the functions can be distributed among the modules and/or different entities in a different manner than is described here.

The mobile device 610 comprises an LF display system 612, a user interface 614, a mobile operating system (OS) 616, a power system 618, and a Global Positioning System (GPS) module 620, among other components. The LF display system 612 is an embodiment of the LF display system 500 depicted in FIG. 5. A user 650 may interact with the mobile device 610 through the user interface 614.

The LF display system 612 may have access to the hardware components of the mobile device 610. For example, the LF display system 612 may power itself by accessing power circuitry within the mobile device to derive power from a power source, such as from a battery or from a charging unit on the mobile device. The tracking system 580 may be able access to one or more cameras or a depth sensor of the mobile device 610, or the GPS module 620. The sensory feedback system 570 may have access to the buttons, switches, the microphone, or the keyboard of the user interface 614. The controller 520 may access the real-time clock (RTC) circuitry within the mobile device as needed for time-based functionalities. The user profiling module 528 may determine user identification with direct access to a fingerprint sensor or a keyboard. The user profiling module may download or upload user profile information via a network interface 614 connected to network 630. The LF display assembly may project holographic content or 2D content, depending on a user setting. In general, the LF display system 612 is integrated into the other hardware components of the mobile device 610.

The mobile device 610 includes a mobile OS 616 that provides mobile operational experiences to a user 650 of the mobile device 610. The mobile OS 616 manages the provision of mobile telephony capabilities, operational functionalities of the LF display system, user interface capabilities suited to the mobile environment including a display and I/O devices, etc. The LF display system 612 may be a holographic display as provided by the LF display system 500. The mobile OS 616 manages application programs executing on the mobile device 610 that may be controlled by the user through the user interface of the mobile OS 616. The user interface may be a graphical user interface (GUI) projected from the LF display system 612. The mobile OS 616 has various abstraction layers, with each layer interfacing with a lower layer, and includes a kernel for managing the mobile device resources such as CPU, memory, and I/O. The kernel provides the features for low level scheduling of processes, inter-process communication, process creation and deletion, interrupt handling, etc. The other abstraction layers of the mobile OS interact with the kernel through system calls or an application programming interface (API) layer. The user 650 of the mobile device 610 interacts with the mobile OS 616 through the user interface 614.

A functional viewpoint of the mobile OS is to consider the mobile OS 616 as an event driven system, residing in a wait loop for events delivered by the hardware of the mobile device 610, and enabling an appropriate response to the delivered events residing within an event queue. Examples of such events may be, for example, a touch on a particular location of a 2D touch screen, an incoming call over the cellular network, a message over the network interface, etc. In addition, the event driven mobile OS 616 may respond to events as reported by the LF display system 612, including a touch of a hand, finger, or other body part onto a projected holographic interface, a gesture reported by the tracking module 526 based on tracking data received from the tracking system 580, a pressure-related touch event on a coincident tactile surface that is co-located on a projected holographic button, etc. The response by the mobile OS to these and other events delivered by the hardware components of the mobile device involves actions performed by the mobile OS at all abstraction layers of the mobile OS functionalities.

The mobile OS 616, or applications running on the mobile OS 616, may manage the LF display system 612, allowing the LF display system 612 to access the hardware components of the mobile device as needed. Applications running on the mobile OS 616 may manage the presentation of holographic content upon request by the user. Similarly, the mobile OS 616 may show holographic user interfaces and accept operational choices from the user based on tracking information provided by the tracking module 526, wherein the tracking module 526 may analyze data from the tracking system 580. The mobile OS 616 may run applications which access social media accounts, and interface with the user profiling module 528 in order to present personalized holographic content. In general, the mobile OS 616 may interface with the controller 520 of the LF display system 612 to manage the controller, display holographic content, and provide access to hardware components of the mobile device 610. In some embodiments, the mobile OS 616 may receive pluggable modules to act as drivers for managing the controller 520 of the LF display system. The mobile OS may interface with these modules or applications running on the mobile OS 616 and access API calls to the controller 520 of the LF display system in order to display holographic content, provide or retrieve user profiling information, to exchange tracking information, etc.

The mobile device 610 includes a power system 618 for powering the various components of the mobile device 610. The power system 618 may include a power management system, one or more power sources (for example, battery, alternating current (AC), a recharging system, a power failure detection circuit, a power converter or inverter, a power status indicator, and other components associated with the generation, management, and distribution of power in mobile devices. As noted earlier, the LF display system 612 may power itself by accessing the power system 618 on the mobile device.

The mobile device 510 includes a GPS module 620. The GPS module 620 determines the location of the mobile device and provides this information for use in various applications. This location information may be provided to the LF display system 500 to be used in applications that may leverage location information, such as map-based applications, etc. In some embodiments, the LF display system 500 may display holographic content in response to data from the GPS module 620, as well as based on the location data received from the GPS module 620. For example, the LF display system 500, in association with an executing navigation application, may display holographic content indicating arrival at a place, once the GPS module provides location coordinates that are mapped to be the destination location by the navigation application executing on the mobile device.

The network 630 may comprise any combination of local area and/or wide area networks, using both wired and/or wireless communication systems. For example, the local area network may include WiFi and Bluetooth networks. In one embodiment, the network 630 uses standard communications technologies and/or protocols. For example, the network 630 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 630 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 630 may be represented using any suitable format, such as hypertext markup language (HTML) or extensible markup language (XML). In some embodiments, all or some of the communication links of the network 630 may be encrypted using any suitable technique or techniques.

One or more remote servers 640 may communicate with the mobile device 610 via the network 630. In one embodiment, a remote server 640 may be an application provider providing applications for execution as well as content for display on the device 610. The remote server may be an online holographic application store that makes available holographic applications for downloading and execution on the mobile device in exchange for a transaction fee. The remote server 640 may be an online holographic content store that makes available holographic content for downloading to mobile devices in exchange for a transaction fee. The remote server 640 may be a third-party application and/or content provider. New applications, new content, as well as updates to existing applications and content may be available for execution and/or display at the device 610 from the remote server 640 through any of a push-enabled or pull-enabled updates through the network 630. These applications and content may contain holographic content tracks to be stored in the data store 522 for projection and display by the light field display system 612. Content made available to the mobile display device 610 may include advertisements, product offers, and product coupons to be displayed by the light field display system 612 in association with executing a software application in the mobile device 610. For example, holographic content depicting a popular animation character may be downloaded from a third party content provider over network 630 and stored in light field display system 612 for use by user 650 as a "holographic avatar" to represent the user 650 in one or more applications.

In one or more embodiments, in order to ensure that unauthorized network access to the device 610 is prevented, the system may use security settings to authenticate network access to the device 610 by an entity, for establishing a secure connection to the device 610, and/or to download content to the device 610. In some embodiments, the device 610 may incorporate authentication factors such as passwords and smart cards, or use biometric methods to enforce access control when accessing the mobile device 610 either through the network 630 or the user interface 614.

Holographic User Interfaces and "Touch" Interpretation in LF Display Systems

The following is a description of some embodiments of the LF display system for generating a holographic user interface (UI) for a user to interact with the mobile device. This description refers to elements illustrated in the LF display system 500 in FIG. 5.

In some embodiments, a generated holographic UI is a user interface that includes one or more holographic UI objects presented to the user. In some embodiments, the presented holographic UI objects may also be part of a virtual image display that depicts, for example, a virtual screen that floats above a surface of the mobile device on which the holographic objects appear to reside. In some embodiments, the presented holographic objects and/or virtual images may augment a physical UI on the device. The generated holographic UI objects may include, but are not limited to, 3D holographic objects such as "buttons," "knobs," "dials," "keypads," etc. The generated holographic objects may also include 2D holographic objects such as a holographic "screen" displaying a holographic menu with a listing of numerous options. The user may be prompted (for example, through audio cues, or through a visually displayed prompt) to select one or more of the options by pointing to or touching a particular option in the holographic menu (for example, with their finger).

In some embodiments, the presented holographic UI objects may be augmented with tactile stimuli to generate a tactile surface that is co-located with a surface of the presented holographic object. Thus, for example, the sensory feedback system 570 may project ultrasonic energy, e.g., pressure waves, to generate a tactile surface that is collocated with a frontally displayed surface on the holographic "button." The tracking system 580 may track movement of the user (for example, movement of the user's finger) towards the holographic "button". The movement information may be sent by the tracking system 580 to the controller 520. The tracking module 526 in the controller 520 may determine that, when the tracked finger is within some threshold distance of the presented tactile surface, the finger is "touching" or "pushing" the holographic "button." Furthermore, in response to this determination by the tracking module 526, the command library 532 may instruct the LF processing engine 530 to render the holographic "button" and the collocated presented tactile surface at a different location, corresponding to the motion of the holographic "button" as if it were "pushed" by the user.

In some embodiments, the holographic UI may be modified or updated in response to information received from the sensory feedback system 570. For example, an accelerometer in the sensory feedback system 570 may measure linear acceleration of the mobile device and may update a displayed holographic UI incrementally in synchrony with the measured acceleration. Similarly, a gyroscope in the sensory feedback system 570 may detect a change in the orientation of the mobile device and may reorient the UI based on the detected change. In some embodiments, the tracking module 526 may track a user's head rotation and may reorient the displayed holographic UI in response.

In another embodiment, the holographic UI may involve presenting a holographic character that greets the user. In some embodiments, the holographic character may be presented along with the presentation of the holographic UI objects. In other embodiments, the holographic character may be first presented to the user, and subsequently, a holographic 'menu' with holographic UI objects may be presented. In some embodiments, the holographic character may be modified in response to commands received from the user. In yet other embodiments, all interactions may involve verbally spoken commands from the user that are received by acoustic receivers in the sensory feedback system 570. In some embodiments, the presented holographic character may be augmented with acoustic stimuli to issue verbal responses to the user though speakers in the mobile device.

In some embodiments, the holographic character may be generated and personalized by an AI model. A holographic character may have a variety of characteristics which may be changed to taste, including any of: appearance (e.g. appearance of a celebrity), clothing (or none), personality, voice (e.g. accent or the voice of a celebrity), temper, language (e.g. amount of curse words used), or other traits. The holographic character may have the appearance of a CG character (e.g. a superhero), a famous personality such as an actor or an athlete, a random selection of one of many available avatars, or another appearance. The appearance of a holographic character may be accompanied by an acoustic voice which is recognizable (e.g. a celebrity voice to match the appearance) and may be changed readily by the user. The holographic character may also access a user profile or a social media account in order to make it more appealing to the user. For example, the holographic character may provide playful feedback based on observed characteristics in photos or discussions that appear on the user's social media accounts, or offer banter based on calendar reminders on the day of a scheduled event. For amusement to a user, the holographic character may be put into a bad mood or a pleasant mood, depending on the selection of the user. Choices for traits of holographic characters to be viewed and experienced on a mobile device may be downloadable via the network 630 via a remote server 640 at a third-party content provider like an online store, in some cases in exchange for a transaction fee.

In some embodiments, the tracking module 526 determines a presence of the user within the target view of the LF display system based on information received from the tracking system 580, analyzes the received information and send the results of the analysis to the command library 532. The command library 532 may use heuristics stored in the command library 532 based on the received analysis, and determine that a user interface needs to be displayed to the user. Furthermore, using the user profile information stored by the user profiling system 528, the command library 532 may apply other heuristics in the command library 532 and determine from the stored mappings that a customized user interface involving the display of a particular holographic character that greets the user of the device needs to be generated. The command library 532 may issue a computational command to the LF processing engine 530 to display the determined holographic character greeting the user for display in the holographic object volume. Executing this computational command may involve the LF processing engine 530 acquiring image data from the data store 522 pertaining to rendering and displaying the holographic character. The command library 532 may also trigger an acoustic transducer in the sensory feedback system 570 to transmit an audible greeting that is in sync with the displayed holographic character. The LF processing engine 530 may use the tracking information obtained from the tracking system 580 to render the holographic character to look at and/or make eye contact, or interact in other ways with the user. Verbal responses from the user may be received by an acoustic receiving device (e.g., a microphone or microphone array) located within the sensory feedback system 570 which presents this received response data to the controller 520 for further processing. The command library 532 may use the data received from the sensory feedback system 570, apply heuristics and determine that, for example, a navigation assistance application interface needs to be displayed to the user, in response to the verbal utterance by the user.

In another embodiment, the user may configure the LF display system to always begin with a presentation of a particular customized 3D holographic user-interface that also is augmented with a display of particular desired applications, such as an email application and/or a social media application. In some embodiments, the mobile device user may configure application settings for various applications in association with the LF display system to have desired particular holographic user interfaces presented for use by the user while executing particular applications.

In other embodiments, the holographic user interface comprises additional or fewer functionalities than those described herein. Similarly, the functions can be distributed among the modules and/or different entities in the LF display system 500 in a different manner than is described here.

The tracking system 580 may track movement of a user (e.g. by using the camera, a set of cameras, a depth sensor, or some other sensors within the tracking system 580). The movement of the user can be sent by the tracking system 580 to the controller 520 for touch interpretation. In some embodiments, the touch interpretation is performed as follows: the tracking system 580 first tracks user movement as the user approaches a presented holographic object (for example, with one or more fingers). The tracking system 580 sends the tracked movement information to the controller 520. The tracking module 526 determines that the tracked finger is within a threshold distance from the presented holographic object, and in response determines that the user is "touching" the holographic object. In other embodiments, touch interpretation may involve tracking other kinds of movements with respect to presented holographic objects by the tracking system 580. Tracked movement by the user may include, but is not limited to, determining that the user is performing one or more of: changing a position, moving, pushing, pressing, dialing, rotating, typing, poking, etc., against one or more presented holographic objects.

In some embodiments, the sensory feedback system 570 may sense "touch" of a tactile surface augmenting a displayed holographic object. This determination may be based on receiving input from pressure sensors in the sensory feedback system 570 that detect modifications caused by the touch in the ultrasonic wave energy that is generating the tactile surface. This information may be sent to the controller 520 for further analysis.

Figure 7:
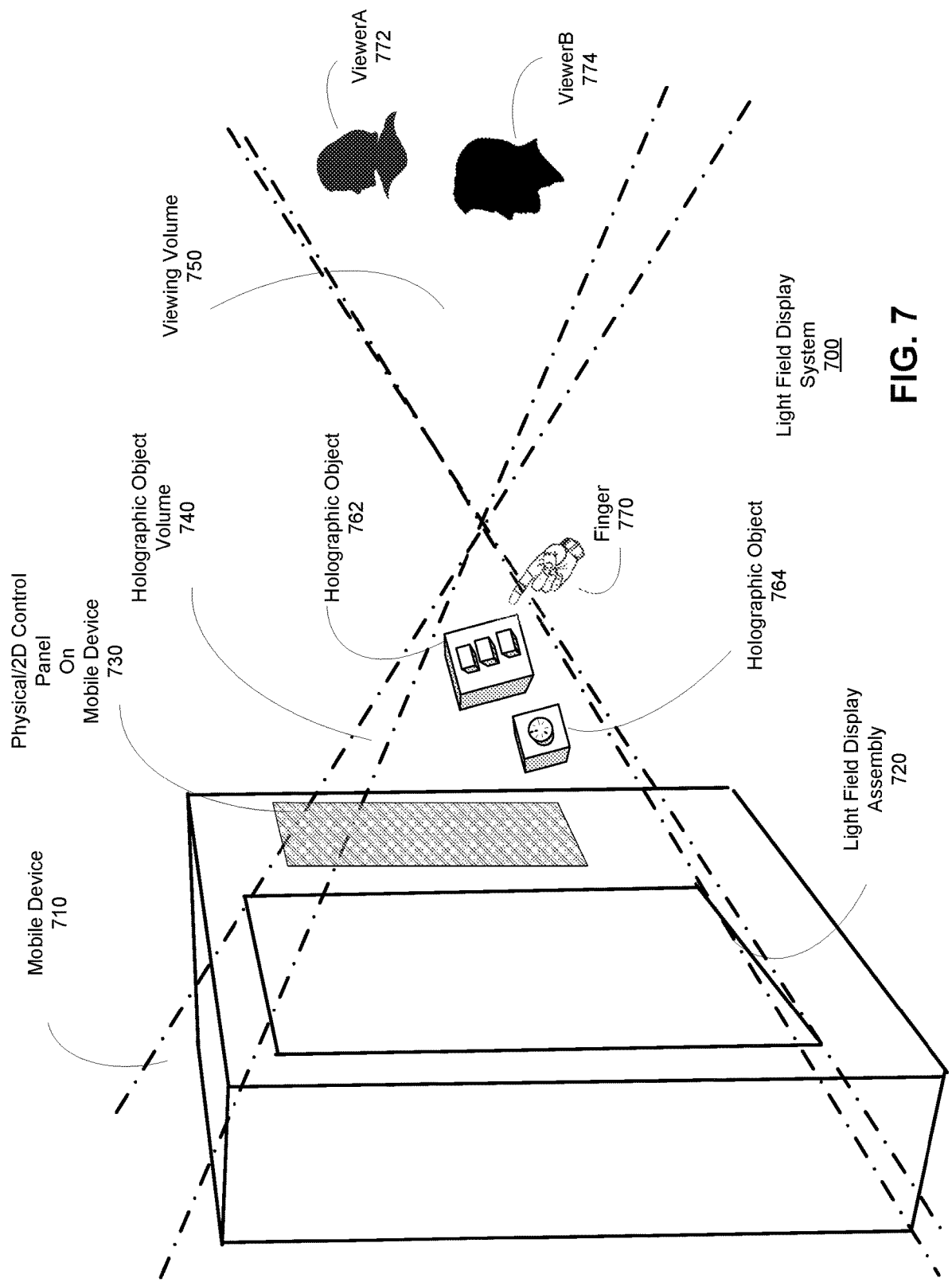
FIG. 7 is a display of an example of an embodiment of using a light field display with a mobile device.

FIG. 7 is an illustration of an embodiment of the LF display system 700 implemented as part of a mobile device, in accordance with one or more embodiments. The LF display system 700 is an embodiment of the LF display system 500 as described in FIG. 5. A mobile device 710 contains a LF display assembly 720 of the LF display system 700. The LF display assembly 720 may be comprised of one or more LF display modules (e.g. LF display module 210 in FIG. 2B or LF display module 412 in FIG. 4A). In one or more embodiments, the mobile device 710 comes with one or more control panels 730 that may contain physical features (such as buttons, etc.) and/or 2D digital displays (including 2D touch screens) for accessing the device by a particular user. In addition, the mobile device 710 also includes a LF display assembly 720 (e.g., the LF display assembly 510 in FIG. 5) for generating holographic content to the user of the device (e.g. viewer A 772 or viewer B 774). The LF display system 700 may also include any combination of the other components of the LF display system 500 shown in FIG. 5, such as the sensory feedback system 570, the tracking system 580, the user profiling system 590, and the controller 520.

The LF display system may present holographic content including at least one holographic object to the user using a LF display assembly 720 comprised of one or more LF display modules. The holographic objects can be three-dimensional (3D), two-dimensional (2D), or some combination thereof. Moreover, the holographic objects may be polychromatic (e.g., full color). As displayed in FIG. 7, the holographic object volume 740 extends both in front of the LF display surface of the LF display assembly 720 and behind it (e.g., similar to holographic object volume 160 shown in FIG. 1). The holographic viewing volume 750 represents the viewing space in which a user may view a holographic object presented by the LF display assembly 720. The holographic objects 762 and 764 can be placed anywhere within the holographic object volume 740. Viewer A 772 and Viewer B 774 may view the displayed holographic objects 762 and 764. The holographic objects 762 and 764 may also have tactile surfaces projected from the LF display system 700 such that the tactile surfaces are coincident with one or more surfaces of the holographic objects. The tracking system of the LF display system 700 may track a user touching the surface of displayed holographic objects 762 or 764, which may cause the sensory feedback system to trigger a response. Thus, the movement of the finger 770 towards, for example, the holographic object 762, as well as the "touch" of the finger 770 upon a tactile surface of the holographic object 762 may be established by the tracking system in the LF display system 700. The projected tactile surfaces coincident with holographic objects 762 and 764 may be adjusted appropriately by the sensory feedback system in response to the movement of the finger 770 (e.g. changing the position of a tactile button simultaneously with changes in the holographic content showing that a button has been pushed)

Customized Holographic Display in Mobile Devices

In some embodiments, the LF display system may use a tracking system in combination with user information obtained by the user profiling system 528 in FIG. 5 to generate a customized interactive experience. As an example, in an application with a holographic UI, generated holographic "buttons" may differ in size based on the user—for example, they may be small for a child, and large in size with brighter colors for easy viewing by an elderly user.

Furthermore, in some embodiments, the LF display system may be customized to display specific content for specific users. Thus, for example, the LF display system may be customized to display holographic "buttons" for one user and a holographic "dial" for another user. Thus, with respect to FIG. 7, when the tracking system 580 tracks the presence of Viewer A 772, the configured settings may cause a customized display of (only) holographic object 762 (i.e., the holographic "buttons") for Viewer A 772. The display of holographic object 764 is not be presented if Viewer B 774 is not present. Similarly, upon sensing the presence of Viewer B 774, the configured settings may cause a customized display of holographic object 764 (i.e., the holographic "dial") for Viewer 774.

In other embodiments, the LF display module may display a customized holographic character to interact with the device user (e.g., look at, speak to, listen to, touch, or some combination thereof). One or more characteristics of the holographic characters may be customized by the user. The customizable characteristics may be any of visual, audio, and personality features of the holographic character. In some embodiments, some or all of the characteristics associated with the holographic character may be retrieved from one or more online systems over a network in exchange for a transaction fee (for example, adding a "Bart Simpson" face to the holographic character). Additionally, the tracking system may track the gaze of the user. The tracking system may provide the gaze information to the LF display system 500 for re-rendering the holographic character to make eye-contact with the user who is interacting with the device.

In some additional embodiments, when multiple users use the mobile device, the user profiling system may build user profiles for each of the device users to store user preferences or other user characteristics. The user profiles may be built by the user profiling module 528 for each of the users, and store these use profiles in the data store 522.

The LF display system may utilize the user profiling system 590 to personalize holographic content to the user during each subsequent use of the device. For example, the LF display system 500 may address the user by name (e.g., visually or by audio). This may involve using tracking information to determine the user identity or through user authentication such as face or voice recognition, entering a password, or some other method. In some embodiments, the LF display system 500 generates holographic content corresponding to the user's response to previously generated holographic content. For example, in some embodiments, the AI machine learning module in the LF processing engine 530 may learn that the user starts each day by checking their email followed by a solving a Sudoku puzzle. The LF display system 500 may generate a holographic 3D "home" screen display with the email application opened along with a display of a Sudoku puzzle that is obtained and rendered based on data stored in the data store 522.

In some embodiments, customizing the light field display for a user may involve a privacy mode, wherein the tracking system 580 tracks the position of the user, and generates customized holographic content to be only visible to the user. FIG. 2B illustrates the multiple viewing sub-volumes 290 that may be formed by the LF display system 200. As described in the sections therein, a user in the viewing sub-volume 290A may perceive a holographic object presented in holographic object volume 255 that a user in viewing sub-volumes 290 B, 290C, and 290D are unable to perceive, thus ensuring viewing privacy. Thus, under these circumstances, a user reading email on a holographic screen display may be assured that the display is only visible to the user, and not to neighboring persons. In other embodiments, all the users in a viewing volume of the LF display assembly may see all the holographic objects located in the holographic viewing volume (but all may see different perspectives depending on user location). The mobile device may offer a privacy setting for the LF display system to render holographic content in a privacy mode for one or more tracked users.

Exemplary User Applications Using LF Display Systems in Mobile Devices

Mobile devices are used in conjunction with a variety of software applications. Several of these applications may be further augmented using an LF display system in the devices. Some of these examples are briefly presented below.

In one embodiment, the LF display system 500 may be used with a puzzle application involving blocks. The LF display system 500 may generate a holographic display of an "empty structure" with markings denoting blocks that need to "fill" the holographic "empty structure". Simultaneously, the system may display a holographic set of "blocks" of various shapes to the viewing player. The image rendering data for generating the structure and the set of "blocks" may be stored in the data store 530 when previously downloading the puzzle application over the network 630. As the player touches a block and moves his or her finger to a correct 3D location in the structure that accommodates the block, the tracking system 580 tracks this motion, and the LF processing engine 530 generates a holographic rendering of the "structure" that has the block moving with the position of the player's finger, and then has the corresponding 3D location "filled" with the block as it is "moved" into position.

Other holographic user applications may involve the use of the sensory feedback system 570 in coordination with the tracking system 580 to generate holographic renderings that "move" when "touched." Examples include presenting holographic renderings that facilitate furniture assembly, teach do-it-yourself applications, as well as educational applications where, for instance medical students are taught to dissect a human body using holographic human body renderings that change in response to identified motions of the user.

In one embodiment, involving generating advertisements for display by the LF display system 500, ultrasonic emitters in the sensory feedback system 570 may be employed to generate tactile surface samples that provide haptic information about a product to the user (for example, a carpet manufacturer may display an advertisement displaying rug samples with varied texture that may be experienced by the user).

Other application examples involve generating holographic renderings of "cyber-pets" that respond to sensory stimuli such as touch and spoken commands and provide the "cyber-pet" owner with an immersive experience with the "cyber-pet." The tracking system 580 and the sensory feedback system 570 together may provide the user with a responsive experience with the holographic "cyber-pet.

FIG. 8 is a flowchart illustrating a process for enabling user interactions with a mobile device using a light field display system, in accordance with one or more embodiments. In one embodiment, the process of FIG. 8 is performed by the light field display system 500 (as shown in FIG. 5). Other entities may perform some or all of the steps of this process in other embodiments. Likewise, embodiments may include different and/or additional steps, or perform the steps in different orders.

The light field display system 500 receives 810 a command from the user. The user command may be received through physical controls, for example, physical buttons that may be pressed and physical touch-enabled screens, that may all be located on the mobile device and be part of the sensory feedback system 570. In another example, user commands may be received as voice commands at acoustic receivers such as acoustic microphones that are part of the sensory feedback system 570. The user command may also be received through holographic object interaction by the user, such as with a displayed holographic UI. The user command may also be received through the tracking system 580 that is tracking a user via instructions from the tracking module 526. In an embodiment, the user command may be captured as a gesture, a body motion, or an expression by the user recorded by the tracking system 580 and analyzed by the tracking module 526. In another embodiment, the user command may be received when the tracking system 580 detects that a user has touched a tactile holographic surface, such as a holographic "button" on the displayed holographic UI. User commands may also be received over a communications network at the mobile device. The received user command is relayed to the command library 532 via the controller for interpretation and analysis.

The light field display system 500 processes 820 the user command to determine a computational command. The command library 532 in the light field display system 500 interprets the received user command, possibly in association with user profile information stored by the user profiling system 528, in conjunction with the tracking module, if necessary, for interpreting user gestures, body motions, or expressions, may apply stored heuristics, and determines a computational command based on the received user command. One example of a determined computational command is a command to generate more holographic content for display by the user of the mobile device. Another example may be to modify generated holographic content. The determined computational command may activate sensors in the LF display system, such as, for example, imaging sensors for tracking the user's gaze. The determined computational command may also activate controls within the mobile device. One example of a determined computational command is to generate more holographic content for display by the user of the mobile device. Another example may be to modify generated holographic content. The generated holographic content may be modified in response to a value of a parameter received at the LF display system. Thus, for example, a holographic "sphere" may be projected to indicate downloading progress when an application is being downloaded on the mobile device over a network. A value of a parameter indicating a percentage of the downloaded content at a point in time as the downloading progresses may be used by the LF display system to depict the holographic sphere filling up with color illustrating the progress in the download of the application. The determined computational command may activate sensors in the LF display system, such as, for example, trigger sensors for tracking the user's gaze. The determined computational command may also activate controls within the mobile device. For example, a computational command may increase speaker volume in the mobile device, or set a particular audio tone as an alarm alert.

The light field display system generates 830 holographic content for display based on the computational command. The LF processing engine 530 in the light field display system 500 receives the determined computational command from the command library 532, and generates 830 the holographic content for display based on the computational command.

The light field display system 500 displays 840 the generated holographic content. The controller 520 sends display instructions to project holographic content from the LF processing engine 530 to the LF display assembly 510. The LF display assembly 510 displays the holographic content to the user.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A mobile device comprising:
 a light field (LF) display system comprising:
  a controller configured to generate holographic content;
  an LF display assembly comprising one or more LF display modules that are configured to present the generated holographic content to a user of the mobile device; and
  a command interface configured to recognize one or more commands from the user;
 wherein the controller is further configured to:
 retrieve at least a part of the holographic content from an online system over a network interface in a first format; and
 convert the first format of the holographic content into a second format for presentation by the LF display assembly, wherein the first format comprises a vectorized format, and the second format comprises a rasterized format.

2. The mobile device of claim 1, wherein the controller is configured to update the generated holographic content in response to a change in an operating state of the mobile device.

3. The mobile device of claim 1, wherein the controller is further configured to modify holographic content based on one or more recognized commands from the user.

4. The mobile device of claim 1, the LF display system further comprising:
 a tracking system comprising one or more tracking devices configured to obtain information about the user of the mobile device; and
 wherein the controller is configured to generate the holographic content for the user based in part on the information obtained by the tracking system.

5. The mobile device of claim 4, wherein the command interface is further configured to receive a command from the user through the holographic UI based on determining that the user is within a threshold distance of the one or more holographic features in the presented holographic UI.

6. The mobile device of claim 4, wherein the command interface is further configured to receive a command from the user through the holographic UI based on determining that the user is within a threshold distance of the one or more holographic features in the presented holographic UI.

7. The mobile device of claim 4, wherein the controller is configured to generate a holographic character for the user based on the information obtained by the tracking system and to update eyes of the generated holographic character to maintain eye-contact with the gaze of the user.

8. The mobile device of claim 4, wherein the tracking system further comprises one or more sensors, and the controller is further configured to generate the holographic content by capturing data from the one or more sensors and generating the holographic content based on the captured data.

9. The mobile device of claim 8, wherein the controller is further configured to modify the generated holographic content based on captured data from the one or more sensors within the tracking system.

10. The mobile device of claim 1, the LF display system further comprising:
 a sensory feedback system comprising at least one sensory feedback device that is configured to receive sensory feedback as the holographic content is presented.

11. The mobile device of claim 10, wherein the command interface is further configured to recognize the received sensory feedback as one or more commands received from the user.

12. The mobile device of claim 1, the LF display system further comprising:
 a sensory feedback system comprising at least one sensory feedback device that is configured to provide sensory feedback as the holographic content is presented.

13. The mobile device of claim 12, wherein the controller is further configured to augment the generated holographic content with sensory content comprising tactile stimuli, acoustic stimuli, temperature stimuli, olfactory stimuli, pressure stimuli, force stimuli, or any combination thereof.

14. The mobile device of claim 12, the sensory feedback system further comprising an ultrasonic energy projection device configured to generate a volumetric tactile surface within a threshold distance of a surface of the presented holographic object or coincident with a surface of a presented holographic object.

15. The mobile device of claim 14, the ultrasonic energy projection device further configured to adjust one or more of: a resistance of the generated volumetric tactile surface to user touch, a texture of the generated volumetric tactile surface, or a tactile strength based on a value of a parameter received at the controller.

16. The mobile device of claim 1, wherein the LF display system is configured to modify the presentation of the holographic content based on environmental characteristics at a location where the holographic content is presented to the user.

17. The LF display system of claim 1, further comprising:
 a tracking system comprising one or more tracking devices configured to obtain information about the user of the mobile device; and
 a user profiling module configured to:
  access the information obtained by the tracking system;
  process the information to identify the user; and
  based on the information obtained by the tracking device, further configured to perform one or more of:
   generating a user profile for the user; and
   modifying the user profile for the user; and
  wherein the controller is further configured to generate the holographic content for the user based in part on the user profile.

18. The LF display system of claim 17, wherein the controller is further configured to use the user profile and an artificial intelligence model to perform one or more of:
 generate the holographic content; and
 modify the holographic content.

19. The LF display system of claim 17, wherein the user profiling module is further configured to:
 update the user profile using information from a social media account of the user; and
 wherein the controller is configured to generate the holographic content based in part on the updated user profile.

20. The mobile device of claim 1, wherein the presented holographic content includes a holographic character.

21. The mobile device of claim 20, wherein characteristics associated with the presented holographic character are configured, at least in part, by the user.

22. The mobile device of claim 20, wherein characteristics associated with the presented holographic character comprise visual, audio, and personality features of the presented holographic character.

23. The mobile device of claim 1, the LF display system further comprising:
a security module comprising an authentication module that is configured to:
receive security credentials from a user; and
authenticate the received security credentials;
enable secure access to one or more functionalities of the mobile device; and
enable the generation of particular holographic content in response to the authentication.

* * * * *